United States Patent
Ishimori et al.

(10) Patent No.: US 9,285,467 B2
(45) Date of Patent: Mar. 15, 2016

(54) RADAR APPARATUS, VEHICLE CONTROL SYSTEM, AND SIGNAL PROCESSING METHOD

(71) Applicant: FUJITSU TEN LIMITED, Kobe-shi, Hyogo (JP)

(72) Inventors: Hiroyuki Ishimori, Kobe (JP); Masayuki Kishida, Kobe (JP); Hisateru Asanuma, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 412 days.

(21) Appl. No.: 13/952,107

(22) Filed: Jul. 26, 2013

(65) Prior Publication Data

US 2014/0028487 A1    Jan. 30, 2014

(30) Foreign Application Priority Data

Jul. 30, 2012    (JP) .................................. 2012-168315

(51) Int. Cl.

| | |
|---|---|
| *G01S 13/06* | (2006.01) |
| *G01S 13/93* | (2006.01) |
| *G01S 13/34* | (2006.01) |
| *G01S 13/42* | (2006.01) |
| *G01S 13/58* | (2006.01) |
| *G01S 13/72* | (2006.01) |
| *G01S 13/86* | (2006.01) |

(52) U.S. Cl.
CPC ............... *G01S 13/06* (2013.01); *G01S 13/345* (2013.01); *G01S 13/42* (2013.01); *G01S 13/584* (2013.01); *G01S 13/723* (2013.01); *G01S 13/867* (2013.01); *G01S 13/931* (2013.01); *G01S 2013/935* (2013.01); *G01S 2013/9325* (2013.01); *G01S 2013/9346* (2013.01); *G01S 2013/9353* (2013.01); *G01S 2013/9357* (2013.01); *G01S 2013/9364* (2013.01); *G01S 2013/9367* (2013.01); *G01S 2013/9375* (2013.01); *G01S 2013/9385* (2013.01)

(58) Field of Classification Search
CPC ....... G01S 13/06; G01S 13/345; G01S 13/42; G01S 13/584; G01S 13/723; G01S 13/867; G01S 13/931; G01S 2013/9325; G01S 2013/9346; G01S 2013/935; G01S 2013/9353; G01S 2013/9357; G01S 2013/9364
USPC ........................ 342/70–72, 90, 107, 109, 133
See application file for complete search history.

(56) References Cited

U.S. PATENT DOCUMENTS

| | | | | |
|---|---|---|---|---|
| 6,040,795 A | * | 3/2000 | Watanabe ............. | G01S 13/931 342/70 |
| 6,067,038 A | * | 5/2000 | Uehara .................. | G01S 13/34 342/109 |
| 2003/0218563 A1 | * | 11/2003 | Miyahara .............. | G01S 13/723 342/70 |
| 2004/0150549 A1 | | 8/2004 | Kumon et al. | |

FOREIGN PATENT DOCUMENTS

JP    A-2004-233275    8/2004

* cited by examiner

*Primary Examiner* — Timothy A Brainard
(74) *Attorney, Agent, or Firm* — Oliff PLC

(57) ABSTRACT

There is provided a radar apparatus. A setting unit is configured to set a first range including at least a reference target. A deriving unit is configured to derive a representative position of targets included in the first range on the basis of position information of the targets included in the first range. An acquiring unit is configured to acquire vehicle information indicating that the vehicle is running in a curve-shaped lane or a road shape in front of the vehicle is a curve shape. When the acquiring unit acquires the vehicle information, the setting unit sets a second range wider than the first range and the deriving unit derives a representative position of targets included in the second range on the basis of position information of the targets included in the second range.

5 Claims, 14 Drawing Sheets

RADAR APPARATUS, VEHICLE CONTROL SYSTEM, AND SIGNAL PROCESSING METHOD

The disclosure of Japanese Patent Application No. 2012-168315 file on Jul. 30, 2012, including specification, drawings and claims is incorporated herein by reference in its entirety.

TECHNICAL FIELD

The present invention relates to a radar apparatus, a vehicle control system and a signal processing method capable of deriving position information of a target.

BACKGROUND

As a reference explaining a technology related to the present invention, there is Japanese Patent Application Publication No. 2004-233275A.

SUMMARY

An object of the present invention is to accurately perform follow-up traveling control in a vehicle.

In order to achieve the above object, according to a first aspect of the embodiments of the present invention, there is provided a radar apparatus configured to radiate a transmission wave relating to a frequency-modulated transmission signal, receive a reflected wave of the transmission wave from a target as a reception signal, and derive at least position information of the target from the reception signal, the radar apparatus comprising: a setting unit configured to set a first range including at least a reference target which is derived according to a value of a longitudinal distance relative to a vehicle mounted with the radar apparatus; a deriving unit configured to derive a representative position of targets included in the first range on the basis of position information of the targets included in the first range; and an acquiring unit configured to acquire at least one of first vehicle information indicating that the vehicle is running in a curve-shaped lane and second vehicle information indicating that a road shape in front of the vehicle is a curve shape, wherein when the acquiring unit acquires the at least one of the first vehicle information and the second vehicle information, the setting unit sets a second range wider than the first range and the deriving unit derives a representative position of targets included in the second range on the basis of position information of the targets included in the second range.

The second range may be a range obtained by extending a longitudinal length of the first range.

The deriving unit may exclude a target of the targets included in the second range, having an absolute value of a lateral distance relative to the vehicle larger than that of the reference target, from the targets for deriving the representative position.

According to a second aspect of the embodiments of the present invention, there is provided a vehicle control system comprising: the radar apparatus; and a vehicle control device configured to control motion of the vehicle on the basis of information acquired from the radar apparatus.

According to a third aspect of the embodiments of the present invention, there is provided a signal processing method of a radar apparatus configured to radiate a transmission wave relating to a frequency-modulated transmission signal, receive a reflected wave of the transmission wave from a target as a reception signal, and derive at least position information of the target from the reception signal, the signal processing method comprising: (a) setting a first range including at least a reference target which is derived according to a value of a longitudinal distance relative to a vehicle mounted with the radar apparatus; (b) deriving a representative position of targets included in the first range on the basis of position information of the targets included in the first range; and (c) acquiring at least one of first vehicle information indicating that the vehicle is running in a curve-shaped lane and second vehicle information indicating that a road shape in front of the vehicle is a curve shape, wherein when the step (c) acquires the at least one of the first vehicle information and the second vehicle information, the step (a) sets a second range wider than the first range and the step (b) derives a representative position of targets included in the second range on the basis of position information of the targets included in the second range.

The deriving unit derives the representative position of the targets in the second range based on the position information of the targets in the second range. A target which is not included in the first range is included in the second range. Thus, it is possible to derive the representative position of the targets in the lane in which the vehicle mounted with the radar apparatus runs, regardless of the road shape.

When the second range is a range obtained by extending a longitudinal length of the first range, it is possible to derive the representative position of the targets in the lane in which the vehicle mounted with the radar apparatus runs, regardless of the road shape, while excluding a target existing on a neighboring lane next to the lane in which the vehicle mounted with the radar apparatus runs, from the targets for deriving the representative position.

When the deriving unit excludes the target having the absolute value of the lateral distance relative to the vehicle lager than that of the reference target, from targets for deriving the representative position, it is possible to derive the representative position of the targets at a position closer to the reference axis of the radar apparatus, and it is possible to derive the representative position of the targets in the lane in which the vehicle mounted with the radar apparatus runs, regardless of the road shape.

When the vehicle control device controls the vehicle on the basis of the position information of the representative target, the representative position of the targets is in the lane in which the vehicle mounted with the radar apparatus runs. Therefore, it is possible for the vehicle to continuously follow the preceding vehicle running in the same lane, regardless of the road shape.

DETAILED DESCRIPTION OF THE EMBODIMENTS

Figure 1:
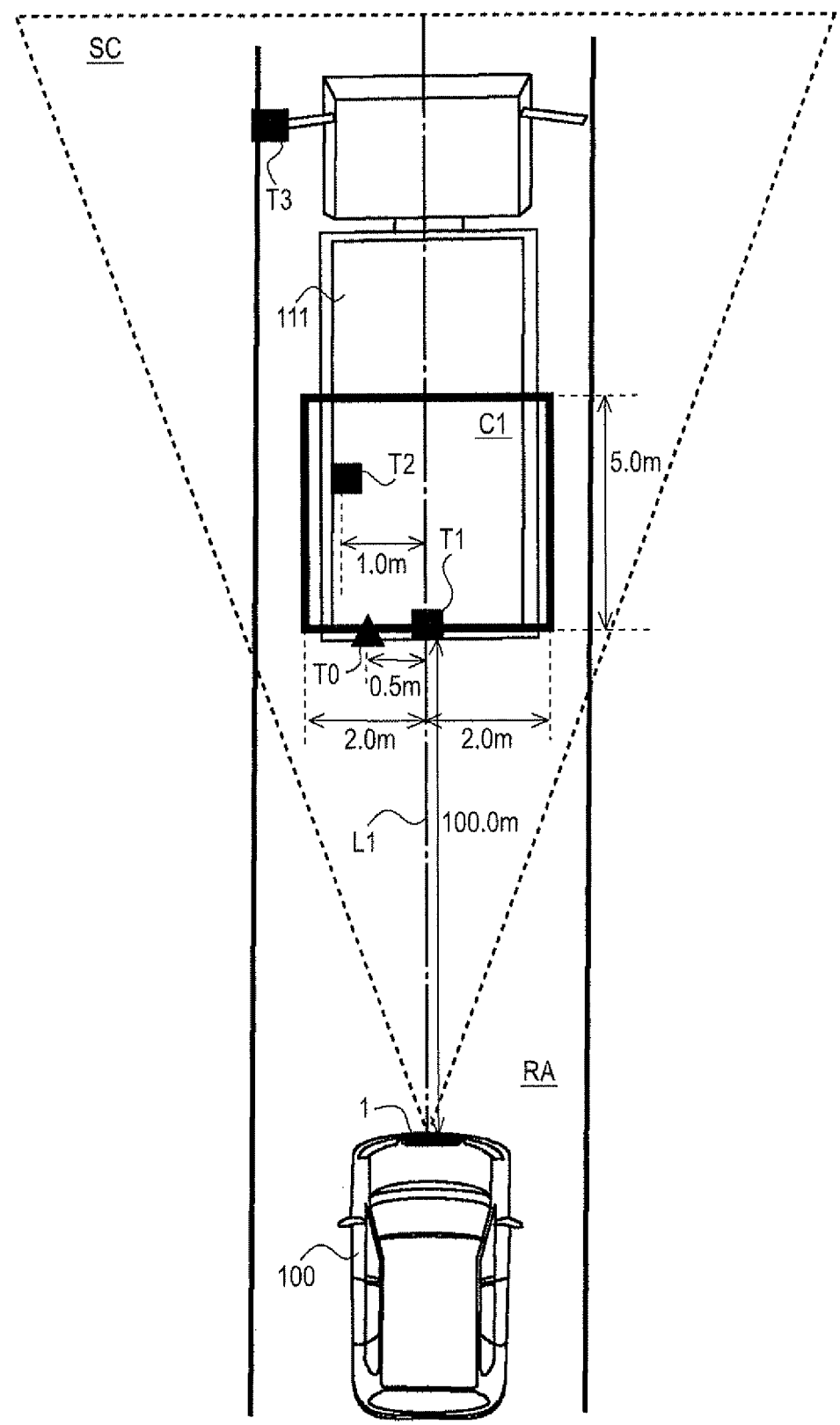
FIG. 1 is a view illustrating a combining process of a signal processing unit of a radar apparatus.

A radar apparatus (for example, a radar apparatus 1 shown in FIG. 1) of a vehicle (for example, a vehicle 100 shown in FIG. 1 to be described below) radiates a transmission wave from the transmitting antennae of the radar apparatus 1. If the radiated transmission wave is reflected from targets, the radar apparatus 1 receives the reflected waves by receiving antennae, and derives information such as the positions of the targets relative to the vehicle 100 (the radar apparatus 1). This specific process is as follows. In the radar apparatus 1, a signal processing unit mixes a transmission signal whose frequency changes with a predetermined period and which corresponds to the transmission wave, and reception signals corresponding to the reflected waves, thereby generating beat signals. Specifically, each predetermined period of the transmission signal includes an UP section where the frequency increases and a DOWN section where the frequency decreases, and the signal processing unit generates signals (hereinafter, referred to as "beat signals") based on the frequency differences between the reception signals and the transmission signal (which are beat frequencies) in each of the UP section and the DOWN section.

Next, the signal processing unit performs Fast Fourier Transform (FFT) on the beat signals, thereby generating signals of different frequencies (hereinafter, referred to as "transformed signals"), and detects signals exceeding a predetermined signal level threshold, as peak signals, from among the transformed signals. Then, on the basis of information such as the signal levels and frequencies of the peak signals, the signal processing unit pairs a peak signal of the UP section and a peak signal of the DOWN section corresponding to each target, thereby deriving pair data.

Next, the signal processing unit derives information such as the positions of the targets based on the pair data. Specifically, on the basis of the pair data, the signal processing unit derives distances until the reflected waves from the targets arrive the receiving antennae of the radar apparatus 1 (hereinafter, referred to as "longitudinal distances"). Also, the signal processing unit derives the distances (hereinafter, referred to as "lateral distances") of the targets relative to the vehicle 100 in directions substantially perpendicular to a reference axis (for example, a reference axis L1 shown in FIG. 1), which is included in a scan range (for example, a scan range SC shown in FIG. 1) and extends in the transmission wave radiation direction of the transmitting antennae of the radar apparatus 1, from the position of the radar apparatus 1 on the vehicle 100 (for example, roughly the center of the front portion of the vehicle 100 shown in FIG. 1).

Consequently, the signal processing unit derives position information including the longitudinal distances and lateral distances of the targets. Here, the reference axis (the position which is the reference for deriving the lateral distances) changes according to the road shape of a lane in which the vehicle 100 runs. Specifically, the signal processing unit of the radar apparatus 1 may acquire the rotation angle of the steering wheel of the vehicle 100 corresponding to the curve radius of a lane RA which has a substantially straight road shape and where the vehicle 100 is running, from a steering sensor, and derive the lateral distances of the targets with respect to the substantially straight reference axis L1 on the basis of the acquired rotation angle.

Also, in a case where the lane in which the vehicle 100 runs is a curve-shaped lane (which will be hereinafter referred to as a "curve lane" and is, for example, a curve lane RB shown in FIG. 2 to be described below), the signal processing unit acquires the rotation angle of the steering wheel of the vehicle 100 corresponding to the curve radius of the curve lane RB, from the steering sensor, and derives the lateral distances of the targets relative to a curved reference axis (for example, a reference axis L1a shown in FIG. 2) based on the acquired rotation angle. Like this, the position which is the reference for deriving the lateral distances changes relatively in response to the rotation angle of the steering wheel of the vehicle 100. Alternatively, the signal processing unit may acquire information on the road shape from at least one of a camera and a navigation device (to be described below) of the vehicle 100, other than the steering sensor.

Further, the signal processing unit derives the relative speeds of the targets to the speed of the vehicle 100 on the basis of the pair data. Also, according to relative speeds, targets can be classified into still targets and moving targets. Specifically, there are still targets each of which has almost the same relative speed as the speed of the vehicle 100 in a speed direction opposite to the speed direction of the vehicle 100 as seen from the vehicle 100, moving targets each of which has a relative speed different from the speed of the vehicle 100 as seen from the vehicle 100, and moving targets each of which has a relative speed almost in the same direction as the speed direction of the vehicle 100 as seen from the vehicle 100. Hereinafter, a moving target will be referred to simply as a target and be described.

Next, the signal processing unit outputs the information of the targets (hereinafter, referred to as "target information") including the position information and relative speeds of the targets to a vehicle control device for controlling the motion of the vehicle 100. As a result, the vehicle control device performs necessary control on the vehicle according to the target information output from the radar apparatus 1. As an example of the control of the vehicle control device on the vehicle 100, there is adaptive cruise control (ACC) for making the vehicle 100 follow another vehicle (which will be hereinafter referred to as a "preceding vehicle" and is, for example, a preceding vehicle 111 shown in FIG. 1) running in front of the vehicle 100 in the same lane as the lane (for example, the lane RA shown in FIG. 1) in which the vehicle 100 with the radar apparatus 1 runs. The following description will be made on the premise of a case where the vehicle control device of the vehicle 100 performs the ACC on the basis of the target information derived by the signal processing unit of the radar apparatus 1 such that the vehicle 100 follows the preceding vehicle 111.

The receiving antennae of the radar apparatus 1 may receive a plurality of reflected waves from the preceding vehicle 111. In this case, the signal processing unit derives a plurality of target information items corresponding to the one preceding vehicle 111 from reception signals based on the reflected waves. In other words, the receiving antennae may receive reflected waves from a plurality of reflective points of the preceding vehicle 111, and the signal processing unit may derive a plurality of targets different in at least one of the longitudinal distance and the lateral distance, from reception signals based on the reflected waves. For this reason, the signal processing unit determines whether a plurality of targets corresponds to one object like the preceding vehicle 111, and performs a target combining process (hereinafter, referred to as a "combining process") which is a process of combining a plurality of targets corresponding to one object, into one.

Hereinafter, the combining process will be described with reference to the accompanying drawings. In the drawings to be described, for convenience of explanation, the scales of the distance between a vehicle and a preceding vehicle, the size of a combining range (which will be described below, and is, for example, a combining range C1 shown in FIG. 1), and the like may be different from actual scales. FIG. 1 is a view for explaining the combining process of the signal processing unit of the radar apparatus 1. Also, FIG. 1 shows the vehicle 100 which has the radar apparatus 1 and runs in the substantially straight lane RA, and the preceding vehicle 111 which runs in front of the vehicle 100 on the lane RA. As the model of the preceding vehicle 111, a truck whose floor is higher than the floor of the vehicle 100 from the road surface of the lane RA will be described as an example.

The radar apparatus 1 of the vehicle 100 shown in FIG. 1 outputs the transmission wave from the transmitting antennae. The radiation range of the transmission wave is, for example, the scan range SC shown in FIG. 1. Then, reflected waves from, for example, three reflective points of the preceding vehicle 111 existing in the scan range SC are received by the receiving antennae of the radar apparatus 1, and three targets corresponding to those reflective waves are derived.

Specifically, a target T1 corresponding to a reflected wave from the rear bumper of the preceding vehicle 111, a target T2 corresponding to a reflected wave of the transmission wave from a wheel or component of the preceding vehicle 111 positioned between the floor of the preceding vehicle 111 and the road surface of the lane RA, and a target T3 corresponding to a reflected wave from the left side mirror of the preceding vehicle 111 are derived. Next, the signal processing unit of the radar apparatus 1 performs the combining process on the basis of the targets included in the combining range C1 (to be described below), thereby deriving the representative position of the targets T1, T2, and T3.

In other words, the signal processing unit selects a target having the smallest longitudinal distance with respect to the vehicle 100 from among the three targets T1, T2, and T3, and sets the selected target as a reference target. In FIG. 1, the target T1 becomes the reference target, and the signal processing unit sets, as the combining range C1, a predetermined range having a length of 5.0 m in the longitudinal direction (the running direction of the vehicle 100) from the position of the target T1 and widths of 2.0 m in lateral directions (directions substantially perpendicular to the running direction of the vehicle 100, that is, the left direction and the right direction) from the position of the target T1. Further, the position of the target T1 is on the reference axis L1.

Here, a target which the vehicle control device sets as an object to be followed (hereinafter, referred to simply as a "guiding object") in the ACC is a target (moving target) existing in the lane (the lane RA in FIG. 1) in which the vehicle 100 runs. Specifically, if the lateral distance of the position of the reference axis L1 is set to 0 m, the vehicle control device sets a positive value as the lateral distance of a target existing in the right direction (the right direction substantially perpendicular to the reference axis L1) from the reference axis L1, and sets a negative value as the lateral distance of a target existing in the left direction (the left direction substantially perpendicular to the reference axis L1) from the reference axis L1.

As the lateral direction from the reference axis L1 increases, the positive value increases, and the negative value decreases. Further, the vehicle control device sets, as the guiding object, a target whose lateral distance is +1.8 m or less in the right direction from the reference axis or −1.8 m or less in the left direction from the reference axis L1. In other words, the vehicle control device sets, as the guiding object, a target having a lateral distance, whose absolute value is 1.8 m or less, from the reference axis L1, but does not set a target having a lateral distance whose absolute value exceeds 1.8 m, as the guiding object.

In a case where the road width of the lane RA in which the vehicle 100 runs is set to about 3.6 m, if the vehicle 100 is running almost along the center of the lane RA, the vehicle control device sets a target having a lateral distance whose absolute value is 1.8 m or less, as the guiding object for the ACC. Meanwhile, if there is a target outside the lane RA in which the vehicle 100 runs, the vehicle control device does not set the corresponding target as the guiding object for the ACC.

Next, on the basis of the targets (the target T1 and the target T2) located in the combining range C1, the signal processing unit derives the representative position of the targets. Specifically, the signal processing unit derives the representative position in which a representative longitudinal distance is the longitudinal distance of the target T1 which is the reference target having the smallest longitudinal distance with respect to the vehicle 100, and a representative lateral distance is the average of the lateral distances of two targets, that is, a target having the smallest lateral distance and a target having the largest lateral distance, included in the targets located in the combining range C1. In driving the representative lateral distance, it is premised that the position of the reference axis L1 is set to 0 m, positive values are set in the right direction from the reference axis L1, and negative values are set in the left direction from the reference axis L1, the closest target to the right side of the combining range C1 becomes the target having the largest lateral distance, and the closet target to the left side of the combining range becomes the target having the smallest lateral distance.

In other words, as shown in FIG. 1, the representative longitudinal distance becomes 100.0 m which is the same longitudinal distance as that of the target T1 which is the reference target. Further, the representative lateral distance becomes −0.5 m (−0.5 m in the left direction substantially perpendicular to the reference axis L1) which is the average of the lateral distances of two targets, that is, the target T1 having the largest lateral distance (0 m) and the target T2 having the smallest lateral distance (−0.1 m), located in the combining range C1. In this way, the signal processing unit derives the representative position corresponding to the representative longitudinal distance of 100.0 m and the representative lateral distance of −0.5 m, and sets a target of the representative position to a representative target T0.

Next, the signal processing unit outputs the target information of the representative target T0 including the position information (representative position information) of the representative target T0 and the relative speed of the representative target T0, to the vehicle control device. The vehicle control device controls the vehicle 100 on the basis of the target information of the representative target T0. Here, the representative target T0 is a moving target, and the absolute value of the lateral distance of the representative target T0 is 1.8 m or less (the absolute value of the representative lateral distance is 0.5 m). Therefore, the vehicle control device sets the representative target T0 as the guiding object for the ACC on the basis of the target information, and controls a brake 50 and a throttle 51 of the vehicle 100 such that the vehicle 100 follows the preceding vehicle 111 corresponding to the representative target T0. As described above, the vehicle control device performs the ACC on the vehicle 100 on the basis of the target information derived by the radar apparatus 1.

Meanwhile, since the target T3 shown in FIG. 1 is outside the combining range C1, the target T3 is not used for the process of deriving the representative position.

However, in a case where the preceding vehicle 111 runs in the curve-shaped lane RB, not a substantially straight lane like the lane RA shown in FIG. 1, even if there is the preceding vehicle 111 running in the lane in which the vehicle 100 runs, the vehicle control device may not set a representative target corresponding to the preceding vehicle 111 as the guiding object for the ACC. A specific example in which in a case where the preceding vehicle 111 runs in a curve lane, the vehicle control device does not set a representative target corresponding to the preceding vehicle 111 as the guiding object for the ACC will be described with reference to FIGS. 2 to 4.

Figure 2:
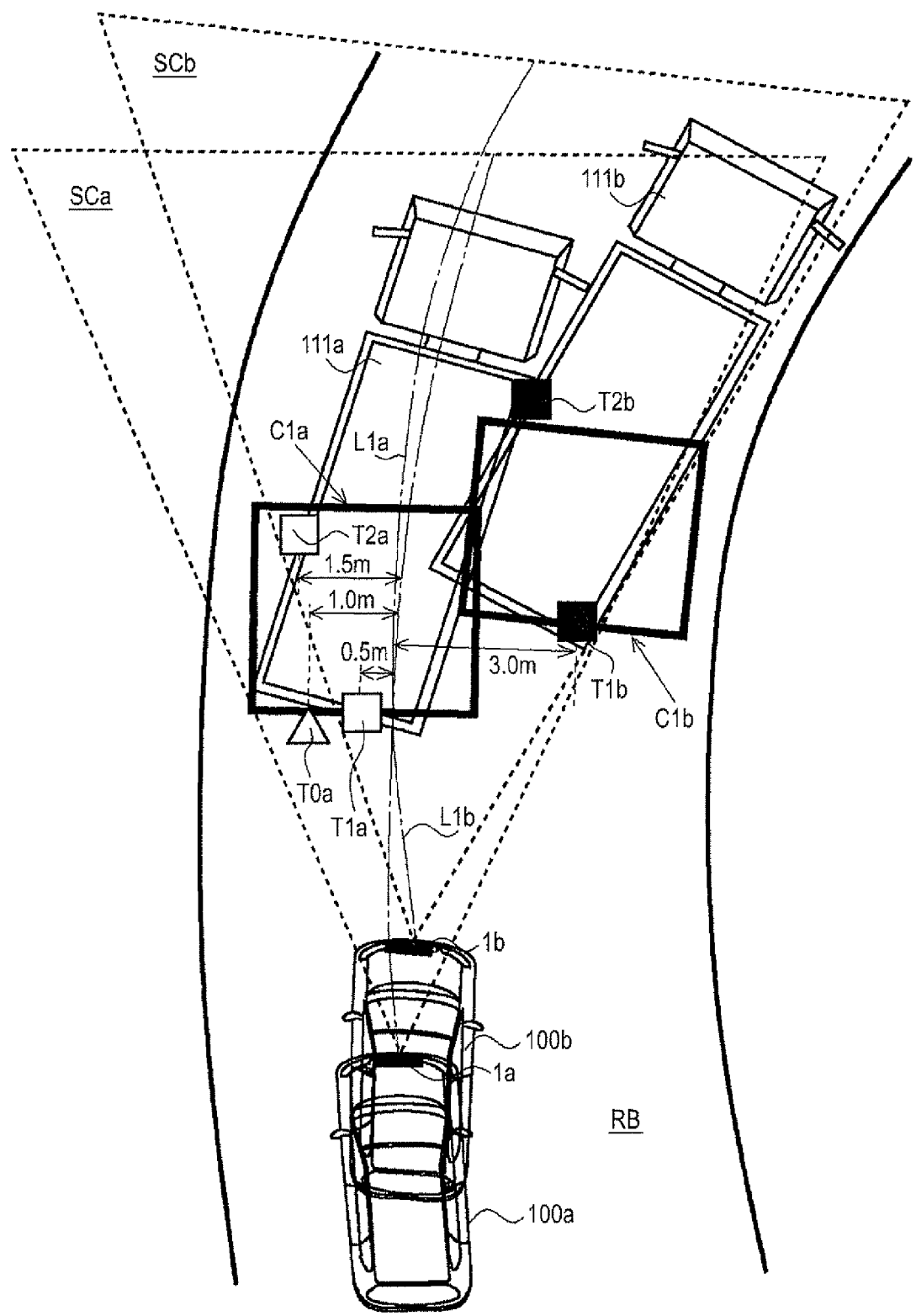
FIG. 2 is a view illustrating changes in the positions of targets in a case where a vehicle and a preceding vehicle run in a curve lane.
Figure 3:
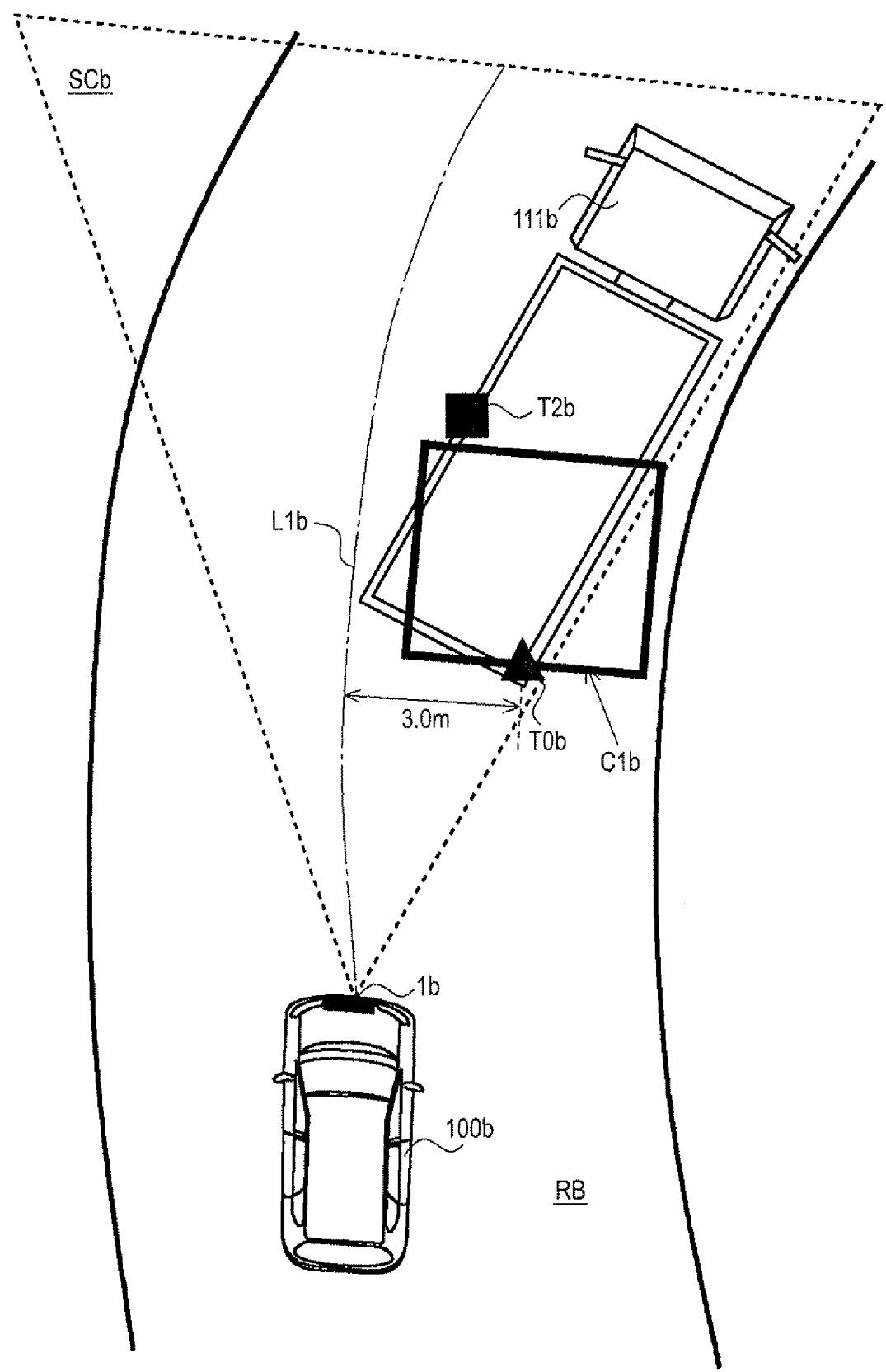
FIG. 3 is a view illustrating changes in the positions of the targets in the case where the vehicle and the preceding vehicle run in the curve lane.

FIGS. 2 and 3 are views illustrating changes in the position information of targets in the case where the vehicle 100 and the preceding vehicle 111 run in the curve lane RB. The configurations of FIGS. 2 and 3 are the same as the configuration described with reference to FIG. 1, and components having reference symbols with "b" attached thereto shows states later in time than components having reference symbols with "a" attached thereto. In other words, if the components having the reference symbols with "b" attached thereto are the current components, the components having the reference symbols with "a" attached thereto are the past components.

As shown in FIG. 2, in a case where the vehicle 100 is at a position shown by a vehicle 100a, the transmission wave radiation range of a radar apparatus 1a becomes a scan range SCa. Further, reflected waves from two reflective points of a preceding vehicle 111a existing in the scan range SCa are received by the receiving antennae of the radar apparatus 1a, and the signal processing unit derives two targets (a target T1a and a target T2a) corresponding to those reflected waves. Next, the signal processing unit selects the target T1a having the smallest longitudinal distance, as the reference target, from the two targets, that is, the target T1a and the target T2a.

Subsequently, the signal processing unit sets a predetermined combining range C1a which has a length of 5.0 m in the longitudinal direction (the running direction of the vehicle 100a) from the position of the target T1a and widths of 2.0 m in lateral directions (directions substantially perpendicular to a reference axis L1a, that is, the left direction and the right direction) from the position of the target T1a.

Next, the signal processing unit derives the representative position of the targets on the basis of the targets (the target T1a and the target T2a) included in the combining range C1a. Specifically, the signal processing unit derives the representative position in which a representative longitudinal distance is the longitudinal distance of the reference target having the smallest longitudinal distance with respect to the vehicle 100, and a representative lateral distance is the average of the lateral distances of two targets, that is, a target having the smallest lateral distance and a target having the largest lateral distance, included in the targets located in the combining range C1a. In other words, the signal processing unit sets the longitudinal distance of the target T1a which is the reference target, as the representative longitudinal distance, and sets the average of the lateral distances of the target T1a (having the largest lateral distance of −0.5 m in the combining range C1a) and the target T2a (having the smallest lateral distance of −1.5 m in the combining range C1a) as the representative lateral distance (lateral distance of −1.0 m). Next, the signal processing unit sets a target of the representative position to a representative target T0a.

The vehicle control device receives the target information of the representative target from the signal processing unit of the radar apparatus 1, and controls the vehicle 100 on the basis of the target information. Here, the absolute value of the lateral distance of the representative target T0a is 1.0 m. Therefore, the vehicle control device sets the representative target T0a as the guiding object for the ACC on the basis of the target information, and controls the brake 50 and the throttle 51 of the vehicle 100a such that the vehicle 100a follows the preceding vehicle 111a corresponding to the representative target T0a.

If the vehicle 100 is displaced from the position of the vehicle 100a to the position of a vehicle 100b as time goes on, the transmission wave radiation range of a radar apparatus 1b of the vehicle 100b becomes a scan range SCb. Then, reflected waves from two reflective points of a preceding vehicle 111b existing in the scan range SCb are received by the receiving antennae of the radar apparatus 1a, and the signal processing unit derives two targets (a target T1b and a target T2b) corresponding to those reflected waves. Next, the signal processing unit selects the target T1b having the smallest longitudinal distance with respect to the vehicle 100, as the reference target, from the two targets, that is, the target T1b and the target T2b.

Subsequently, the signal processing unit sets a predetermined combining range C1b in which has a length of 5.0 m in the longitudinal direction (the running direction of the vehicle 100b) from the position of the target T1b and widths of 2.0 m in lateral directions (directions substantially perpendicular to a reference axis L1b (the left direction and the right direction)) from the position of the target T1b.

In general, as the curve radius of the curve lane RB in which the preceding vehicle 111 runs decreases, the inclination of the preceding vehicle 111 relative to the vehicle 100 running behind the preceding vehicle 111 increases. Further, as the curve radius of the curve lane RB increases, the inclination of the preceding vehicle 111 relative to the vehicle 100 decreases. Specifically, as shown in FIG. 2, the curve radius when the preceding vehicle 111 is at the position of the preceding vehicle 111b is smaller than the curve radius when the preceding vehicle 111 is at the position of the preceding vehicle 111a. Therefore, the inclination of the preceding vehicle 111b relative to the vehicle 100b is larger than the inclination of the preceding vehicle 111a relative to the vehicle 100a.

With this change in the inclination of the preceding vehicle 111, the position information of the reference target corresponding to the preceding vehicle 111 and the other targets corresponding to the preceding vehicle 111 changes. Specifically, as shown in FIG. 2, as the inclination of the preceding vehicle 111 relative to the vehicle 100 increases, the position of the reference target T1a located in the combining range C1a moves to the position of the target T1b on the inner side of the curve lane RB (in the right direction relative to the reference axis L1a), and the position of the target T2a also moves to the position of the target T2b on the inner side of the curve lane RB.

In a case where the preceding vehicle 111 is at the position of the preceding vehicle 111a, the target T2a is inside the combining range C1a. However, in a case where the preceding vehicle 111 is at the position of the preceding vehicle 111b, the target T2b is outside the combining range C1b. In other words, with respect to the reference target (for example, the target T1a) corresponding to the preceding vehicle 111, the distance of another target (for example, the target T2a) in the longitudinal direction (the running direction of the vehicle 100a) tends to increase as the inclination of the preceding vehicle 111 relative to the vehicle 100 increases.

Next, the signal processing unit derives a representative position on the basis of the target T1b included in the combining range C1b. Specifically, the signal processing unit derives a representative position in which a representative longitudinal distance is the longitudinal distance of the target T1b which is the reference target, and a representative lateral distance is the lateral distance of the target T1b as shown in FIG. 3. Next, the signal processing unit sets a target of the representative position to a representative target T0b.

For example, the lateral distance of the representative target T0b becomes +3.0 m in the right direction substantially perpendicular to the reference axis L1b as shown in FIG. 3. The vehicle control device receives the target information of the representative target T0b including information on the lateral distance, from the signal processing unit of the radar apparatus 1b. Then, since the absolute value of the lateral distance of the representative target is 3.0 m larger than 1.8 m, the vehicle control device determines that the representative target T0b is not the guiding object for the ACC, and releases the ACC relative to the preceding vehicle 111b corresponding to the representative target T0b. However, principally, even in the case where the preceding vehicle runs in the curve lane RB, it is preferable that the vehicle control device should determine that the representative target of the preceding vehicle 111b is the guiding object for the ACC such that the vehicle 100b follows the preceding vehicle 111b.

Figure 4:
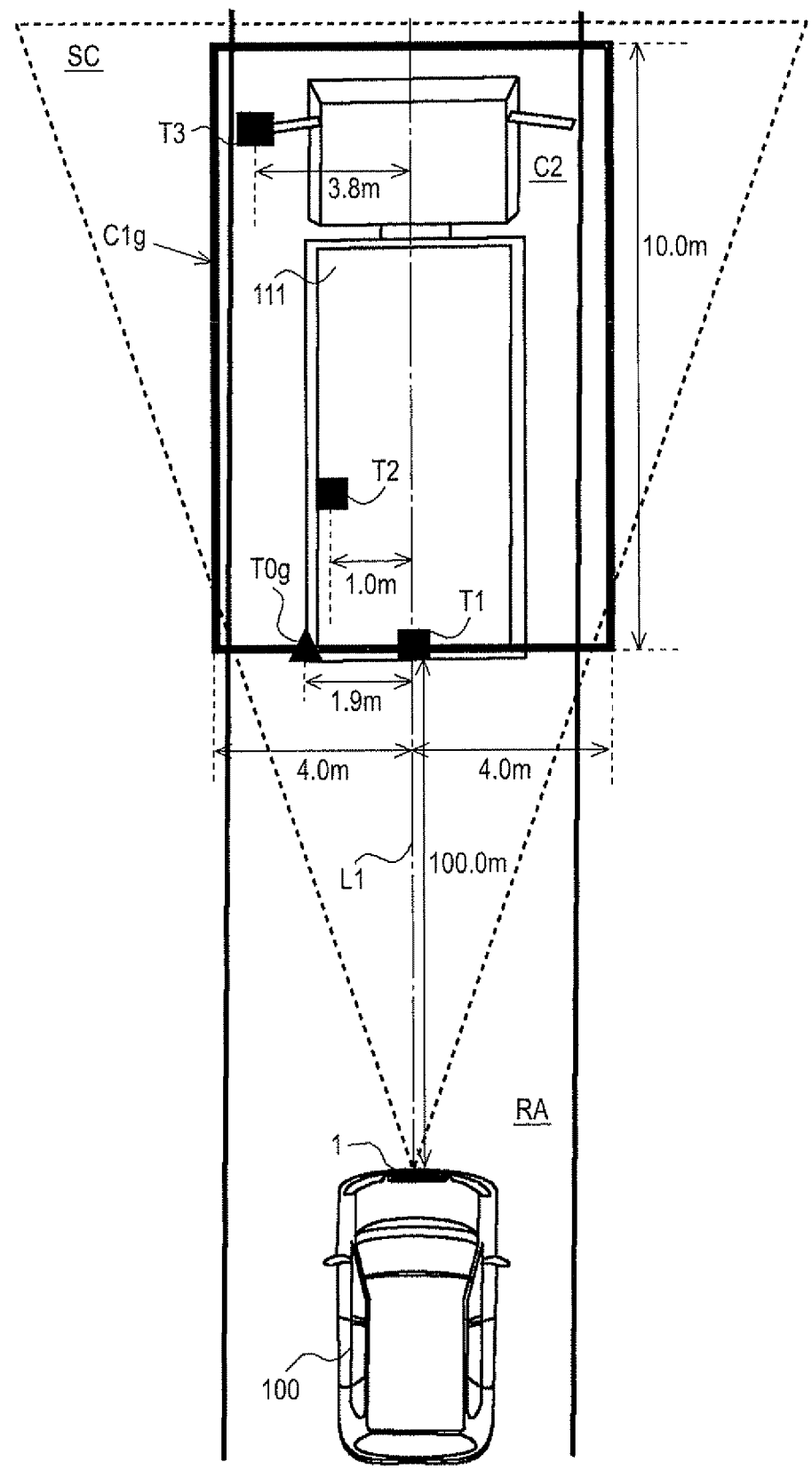
FIG. 4 is a view illustrating a case of setting a combining range wider than a predetermined combining range and performing the combining process.

With respect to this, it can be considered to widen the combining range in a case of performing the combining process such that the combining range includes as many targets corresponding to the preceding vehicle 111 as possible. FIG. 4 is a view illustrating a case of setting a combining range C2 wider than the combining range C1 and performing the combining process. The configuration shown in FIG. 4 is almost the same as the configuration shown in FIG. 1 except that in a case where the vehicle 100 is running in the substantially straight lane RA, the combining range C2 wider than the combining range C1 is set, and the combining process is performed.

In other words, the combining range C1 has the longitudinal length of 5.0 m and the lateral lengths of 2.0 m in the left direction and the right direction, that is, the total lateral distance of 4.0 m; whereas the combining range C2 has a longitudinal length of 10.0 m and lateral lengths of 2.0 m in the left direction and the right direction, that is, the total lateral distance of 4.0 m. Consequently, the size of the combining range C2 is twice the size of the combining range C1. This range expansion makes it possible that the combining range C2 includes more targets corresponding to the preceding vehicle 111 than the combining range C1 does. Specifically, as shown in FIG. 4, in addition to the target T1 and the target T2, the target T3 can be included in the combining range C2.

However, since the target T3 is included in the combining range C2, the absolute value of the lateral distance of a representative target based on a representative position derived by the combining process of the signal processing unit may not satisfy the condition of the guiding object for the ACC of the vehicle control device. In other words, as shown in FIG. 4, the signal processing unit derives a representative position in which a representative longitudinal distance is the longitudinal distance of the target T1 which is the reference target, and a representative lateral distance is the average (a lateral distance of −1.9 m) of the lateral distances of the target T1 included in the combining range C2 and having the largest lateral distance (a lateral distance of 0 m) and the target T3 included in the combining range C2 and having the smallest lateral distance (a lateral distance of −3.8 m). Next, the signal processing unit sets a target of the representative position to a representative target T0g.

Here, the lateral distance of the representative target T0g is −1.9 m, and the absolute value of the lateral distance is 1.9 m. Therefore, the vehicle control device determines that the representative target T0g is not the guiding object for the ACC. Like this, even if a wide combining range is always set in the combining process, the vehicle control device may erroneously determine that a preceding vehicle corresponding to a target which should be a guiding object is not a guiding object, and may not continuously perform the follow-up traveling by the ACC.

FIRST EMBODIMENT

1. Configuration

<1-1. General View of Vehicle>

Figure 5:
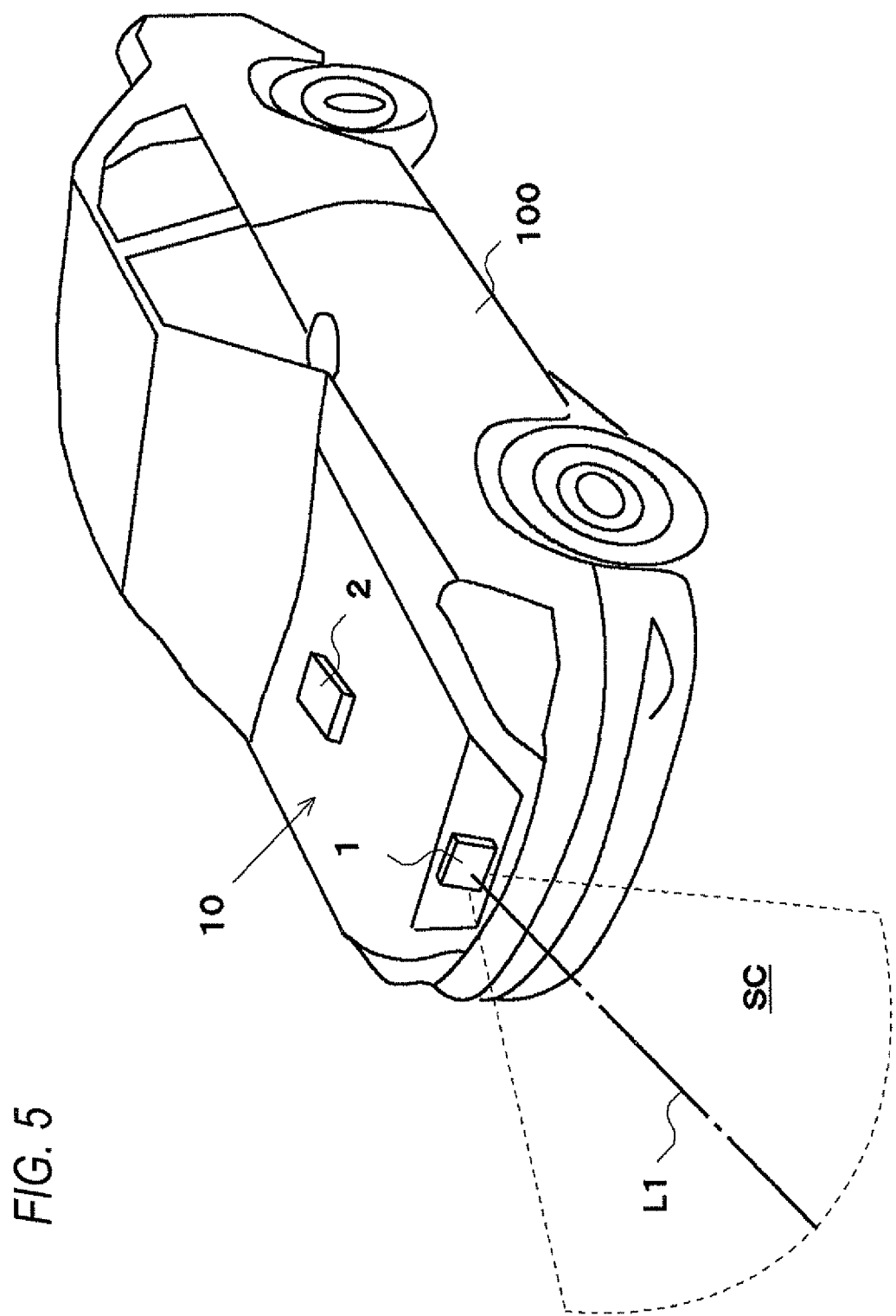
FIG. 5 is a general view of the vehicle.

FIG. 5 is a general view of a vehicle 100. The vehicle 100 mainly includes a radar apparatus 1 and a vehicle control device 2, which are included in a vehicle control system 10 of the present embodiment. The radar apparatus 1 is mounted roughly at the center of the front portion of the vehicle. The radar apparatus 1 scans a scan range SC including a reference axis L1 extending in the transmission wave radiating direction of transmitting antennae, and derives position information including the longitudinal distance and lateral distance of each target relative to the vehicle 100. The lateral distance corresponds to the angle of the corresponding target as will be described. Also, the radar apparatus 1 derives the relative speed of each target relative to the speed of the vehicle 100.

Although the radar apparatus 1 of FIG. 5 has been mounted on a front portion of the vehicle, the mounting position of the radar apparatus 1 onto the vehicle 100 is not limited to the front portion. The radar apparatus 1 may be mounted on any other portion such as a side mirror of the vehicle 100 where it is possible to derive the position of each target existing in front of the vehicle 100.

The vehicle control device 2 is installed inside the vehicle 100, and is an electronic control unit (ECU) for controlling each unit of the vehicle 100.

<1-2. Block Diagram of System>

Figure 6:
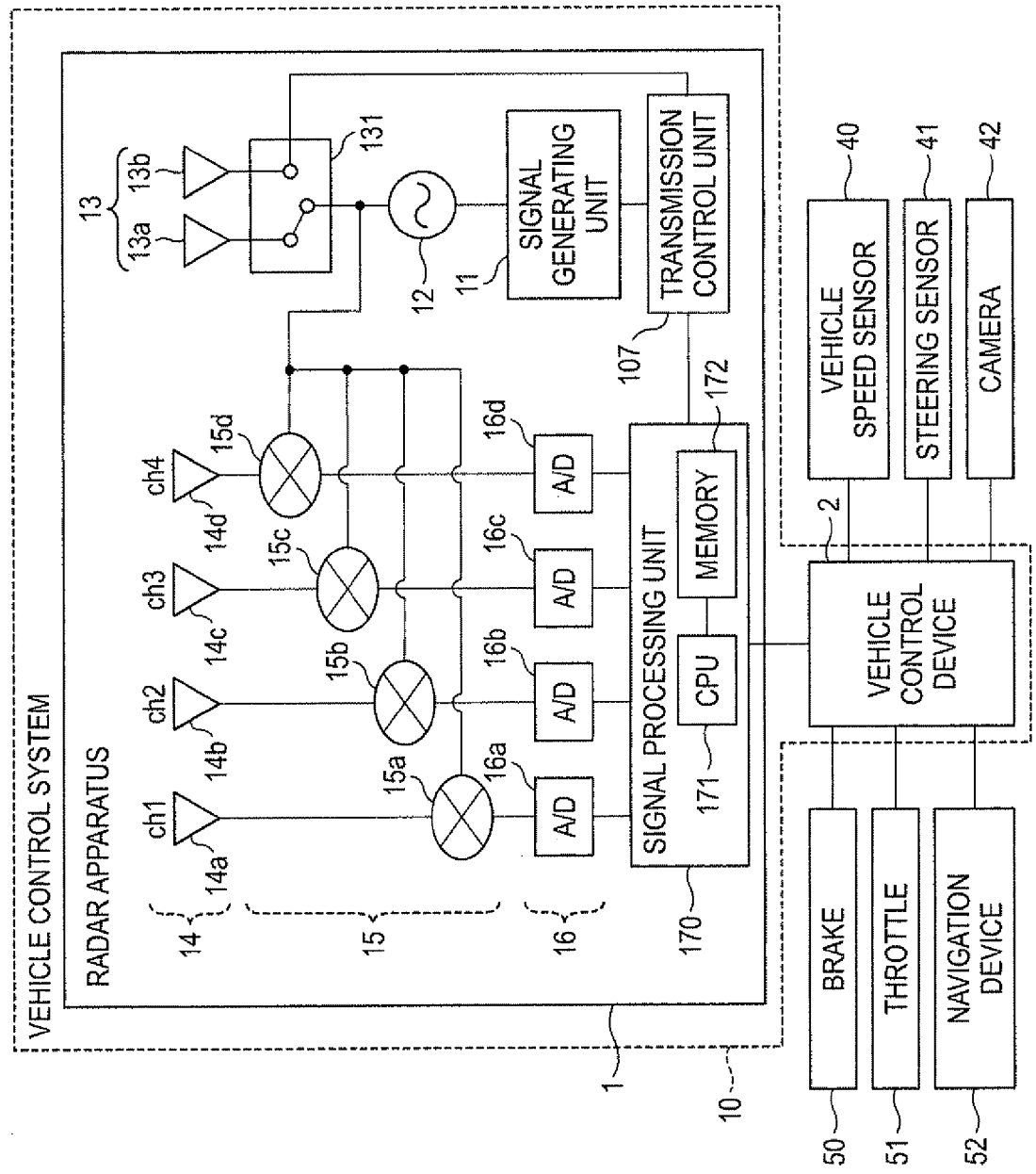
FIG. 6 is a block diagram illustrating a vehicle control system.

FIG. 6 is a block diagram illustrating the vehicle control system 10. The vehicle control system 10 includes the radar apparatus 1 and the vehicle control device 2. In the vehicle control system 10, the radar apparatus 1 and the vehicle control device 2 are electrically connected to each other, and the vehicle control system 10 mainly outputs target information derived by the radar apparatus 1, to the vehicle control device 2. In other words, the radar apparatus 1 outputs target information on the longitudinal distance, lateral distance, and relative speed of each target relative to the vehicle 100, to the vehicle control device 2. Then, on the basis of the target information, the vehicle control device 2 controls the operation of each unit of the vehicle 100.

Also, the vehicle control device 2 is electrically connected to various sensors such as a vehicle speed sensor 40, a steering sensor 41, and a camera 42 provided to the vehicle 100. Further, the vehicle control device 2 is electrically connected to various units such as a brake 50, a throttle 51, and a navigation device 52 provided to the vehicle 100. Although the vehicle speed sensor 40, the steering sensor 41, the camera 42, the brake 50, the throttle 51, and the navigation device 52 have been provided outside the vehicle control system 10, some of those components may be provided inside the vehicle control system 10 according to the function of the vehicle control system 10.

The radar apparatus 1 derives the target information of each target such as a preceding vehicle existing in front of the vehicle 100 with the radar apparatus 1 mounted thereon. Specifically, the radar apparatus 1 radiates a transmission wave relating to a frequency-modulated transmission signal. If the transmission wave is reflected from a target, the radar apparatus 1 receives the reflected wave as a reception signal, and derives target information from the reception signal. Next, on the basis of the target information derived by the radar apparatus 1, the vehicle control device 2 outputs various signals such as control signals for operating the brake 50 or adjusting the opening of the throttle 51 in the ACC, to each unit of the vehicle.

The radar apparatus 1 mainly includes a signal generating unit 11, an oscillator 12, transmitting antennae 13, receiving antennae 14, mixers 15, analog-to-digital (AD) converters 16, and a signal processing unit 17.

The signal generating unit 11 generates a modulated signal whose voltage changes, for example, in a triangular wave form, on the basis of a control signal of a transmission control unit 107 to be described below.

The oscillator 12 is a voltage control oscillator for controlling an oscillation frequency by a voltage, and performs frequency modulation on a signal in a predetermined frequency band (for example, a signal in a frequency band with 76.5 GHz as the center frequency) on the basis of the modulated signal generated by the signal generating unit 11.

The transmitting antennae 13 output the transmission wave relating to the transmission signal to the outside of the vehicle 100. The radar apparatus 1 of the present embodiment includes two transmitting antennae, that is, a transmitting antenna 13a and a transmitting antenna 13b. Switching between the transmitting antennae 13a and 13b is performed at a predetermined interval by switching of a switching unit 131, such that the transmission wave is output from an transmitting antenna 13 connected to the oscillator 12 to the outside of the vehicle 100.

The switching unit 131 is a switch for switching between the transmitting antennae 13 to be connected to the oscillator 12, and connects any one transmitting antenna of the transmitting antenna 13a and the transmitting antenna 13b to the oscillator 12 according to a signal of the transmission control unit 107.

The receiving antennae 14 are a plurality of antennae for receiving the reflected wave of the transmission wave, continuously transmitted from the transmitting antennae 13, from each target. In the present embodiment, there are provided four receiving antennae, that is, a receiving antennae 14a (ch1), 14b (ch2), 14c (ch3), and 14d (ch4). The receiving antennae 14a to 14d are disposed at regular intervals.

The mixers 15 are provided for the receiving antennae, respectively. Each mixer 15 mixes a reception signal and the transmission signal, thereby generating a beat signal which is a difference signal between the transmission signal and the reception signal, and outputs the beat signal to a corresponding AD converter 16.

The AD converter 16 samples the beat signal which is an analog signal, at predetermined intervals, thereby deriving a plurality of sample data items. Then, the AD converter 16 quantizes the sample data items, thereby converting the beat signal which is analog data, into digital data, and outputs the digital data to the signal processing unit 17. Like the mixers 15, the AD converters 16 are also provided for the receiving antennae, respectively.

The signal processing unit 17 is a computer including a CPU 171 and a memory 172, and performs an FFT process on the beat signals output from the AD converters 16, thereby deriving peak signals of an UP section and a DOWN section, and pairs the peak signals of the UP section and the DOWN section, thereby information such as the position information of each target. Here, the signal processing unit 17 performs a combining process of deriving one representative target on the basis of a plurality of targets derived by one time of scanning. Specifically, the signal processing unit 17 sets a predetermined combining range (which will be hereinafter referred to as a "first combining range" and is, for example, a combining range C1c in FIG. 11) including at least a reference target derived according to the lateral distance relative to the vehicle 100 (the distance until the reflected wave of the target arrives the receiving antennae 14 of the radar apparatus 1), and derives the representative position of targets included in the first combining range.

Also, in a case of receiving information indicating that the vehicle 100 is running in a curve-shaped lane, from the steering sensor 41 through the vehicle control device 2, the signal processing unit 17 sets a combining range (which will be hereinafter referred to as a "second combining range" and is, for example, a combining range C1d in FIG. 12) wider than the first combining range. Then, the signal processing unit 17 derives the representative position of targets included in the second combining range. The reason is that in a case where the user of the vehicle 100 operates a steering wheel by more than a predetermined amount in the left or right direction, the preceding vehicle 111 has been already running in front of the vehicle 100 in the curve lane (for example, the curve lane RB shown in FIG. 11).

Also, in a case of receiving information indicating that a road shape in front of the vehicle 100 is a curve shape, from at least one of the camera 42 and the navigation device 52 through the vehicle control device 2, the signal processing unit 17 sets the second combining range on the basis of that vehicle information, and derives the representative position of targets. The reason is that in a case where the information from the camera 42 and the navigation device 52 is information indicating that the shape of a road on which the vehicle 100 is running from that time is a curve shape, the preceding vehicle 111 has been already running in front of the vehicle 100 in the curve lane RB. As a result, it is possible to include a target the preceding vehicle 111, which has not been included in the first combining range, in the second combining range in the combining process, and to derive the representative position of targets in the lane RB in which the vehicle 100 with the radar apparatus 1 mounted thereon runs, regardless of the road shape. The combining process will be described below in detail.

The CPU 171 performs various arithmetic processes which are for deriving target information and includes the combining process, on the basis of various programs recorded in the memory 172.

The memory 172 stores execution programs for performing processes such as various arithmetic processes to be executed by the CPU 171. Also, the memory 172 stores a plurality of target information items derived by the signal processing unit 17. For example, the memory 172 stores target information derived in the past scanning and the current scanning. Further, the memory 172 stores data of the first combining range and the second combining range, and reads data of one combining range to be applied in a case where the CPU 171 performs the combining process.

The transmission control unit 107 is connected to the signal processing unit 17, and outputs a control signal to the signal processing unit 17 for generating a modulated signal, on the basis of a signal from the signal processing unit 17. Also, the transmission control unit 107 outputs a control signal to the switching unit 131 for connecting the oscillator 12 to any one transmitting antenna of the transmitting antenna 13a and the transmitting antenna 13b, on the basis of a signal from the signal processing unit 17.

The vehicle control device 2 controls the operation of each unit of the vehicle 100 for controlling the motion of the vehicle 100. In other words, the vehicle control device 2 acquires information from various sensors such as the vehicle speed sensor 40 and the steering sensor 41. Then, on the basis of the information acquired from various sensors and target information acquired from the signal processing unit 17 of the radar apparatus 1, the vehicle control device 2 operates various units such as the brake 50 and the throttle 51, thereby controlling the motion of the vehicle 100.

Also, in a case where a rotation angle input from the steering sensor 41 exceeds a predetermined rotation angle, the vehicle control device 2 outputs vehicle information (hereinafter, referred to as "first vehicle information") indicating that the vehicle 100 is running in a curve-shaped lane, to the signal processing unit 17 of the radar apparatus 1. Further, if detecting that the road shape in front of the running vehicle 100 is a curve shape, on the basis of information on images acquired by the camera 42, the vehicle control device 2 outputs vehicle information (hereinafter, referred to as "second vehicle information") indicating that the road shape in front of the vehicle 100 is a curve shape, to the signal processing unit 17.

Furthermore, if detecting that the shape of the front road on which the vehicle 100 is running from that time is a curve shape, on the basis of map information and the position information (information on the latitude and longitude) of the vehicle 100 derived according to a signal which the navigation device 52 has received from a GPS satellite, the vehicle control device 2 outputs the second vehicle information to the signal processing unit 17.

Also, the vehicle control device 2 sets a preceding vehicle (for example, the preceding vehicle 111a shown in FIG. 11) running in front of the vehicle 100 (specifically, for example, the vehicle 100a shown in FIG. 11) in the lane (for example, the lane RB shown in FIG. 11 to be described below) in which the vehicle 100 runs, as the guiding object, and performs control such that the vehicle 100 follows the preceding vehicle 111a. Specifically, as the vehicle 100 runs, the vehicle control device 2 controls at least one of the brake 50 and the throttle 51, thereby performing the ACC such that the vehicle 100a follows the preceding vehicle 111a with a predetermined distance between the vehicle 100a and the preceding vehicle 111a.

The vehicle speed sensor 40 outputs a signal according to the speed of the vehicle 100 on the basis of the number of revolutions of the axle of the vehicle 100. On the basis of the signal from the vehicle speed sensor 40, the vehicle control device 2 acquires the current speed of the vehicle.

The steering sensor 41 senses the rotation angle of the steering wheel according to the operation of the driver of the vehicle 100, and transmits the angle information of the vehicle 100 to the vehicle control device 2.

The camera 42 is, for example, a front camera which is provided almost at the center in the left-right direction of a front bumper which is the front end of the vehicle 100, and the optical axis of the camera 42 is directed toward the running direction of the vehicle 100. The camera 42 images a road, and transmits various information, such as image information with respect to the shape of the road, to the vehicle control device 2. Here, the image information relative to the road shape is image information such as compartment lines including white lines drawn on the surface of the road, and roadside objects installed on the road.

The brake 50 reduces the speed of the vehicle 100 according to the operation of the driver of the vehicle 100. Also, the brake 50 reduces the speed of the vehicle 100 under the control of the vehicle control device 2. For example, the brake 50 reduces the speed of the vehicle 100 to maintain the distance between the vehicle 100 and the preceding vehicle at a certain distance.

The throttle 51 increases the speed of the vehicle 100 according to the operation of the driver of the vehicle 100. Also, the throttle 51 increases the speed of the vehicle 100 under the control of the vehicle control device 2. For example, the throttle 51 increases the speed of the vehicle 100 to maintain the distance between the vehicle 100 and the preceding vehicle at the certain distance.

The navigation device 52 searches for a route to a destination set by the driver of the vehicle 100, displays the position of the vehicle 100 and a map showing the road shape around the vehicle on a display unit of the navigation device 52, and guides the driver through the route to the destination. Also, the navigation device 52 acquires information representing the position of the vehicle 100 in latitude and longitude on the basis of a signal received from the GPS satellite, and displays the position information on the display unit of the navigation device 52.

2. Signal Processing of FM-CW

Now, as an example of a signal processing scheme in which the radar apparatus 1 derives the position of a target, a frequency modulated continuous wave (FM-CW) scheme will be described. Although the FM-CW scheme will be described as an example in the present embodiment, the present invention is not limited to the FM-CW scheme, and any other scheme of combining a plurality of sections, such as an UP section in which the frequency of a transmission signal increases, and a DOWN section in which the frequency of a transmission signal decreases, thereby deriving a target can be used.

Also, in the following equations and FIG. 7, reference symbols for FM-CW signals and beat frequencies are shown as follow. A symbol fr denotes a distance frequency, a symbol fd denotes a speed frequency, a symbol fo denotes the center frequency of a transmission wave, a symbol $\Delta F$ denotes a frequency shift width, a symbol fm denotes the repetition frequency of a modulated wave, a symbol c denotes a light speed (the speed of an electric wave), a symbol T denotes the round-trip time of the electric wave between the vehicle 100 and a target, a symbol fs denotes a transmission (reception) frequency, a symbol fb denotes a beat frequency, a symbol R denotes a longitudinal distance, a symbol V denotes a relative speed, a symbol fup denotes the distance frequency of an UP section, a symbol fdn denotes the distance frequency of a DOWN section, a symbol θm denotes the angle of the target, a symbol θup denotes an angle corresponding to the beat signal of the UP section, and a symbol θdn denotes an angle corresponding to the beat signal of the DOWN section.

Figure 7:
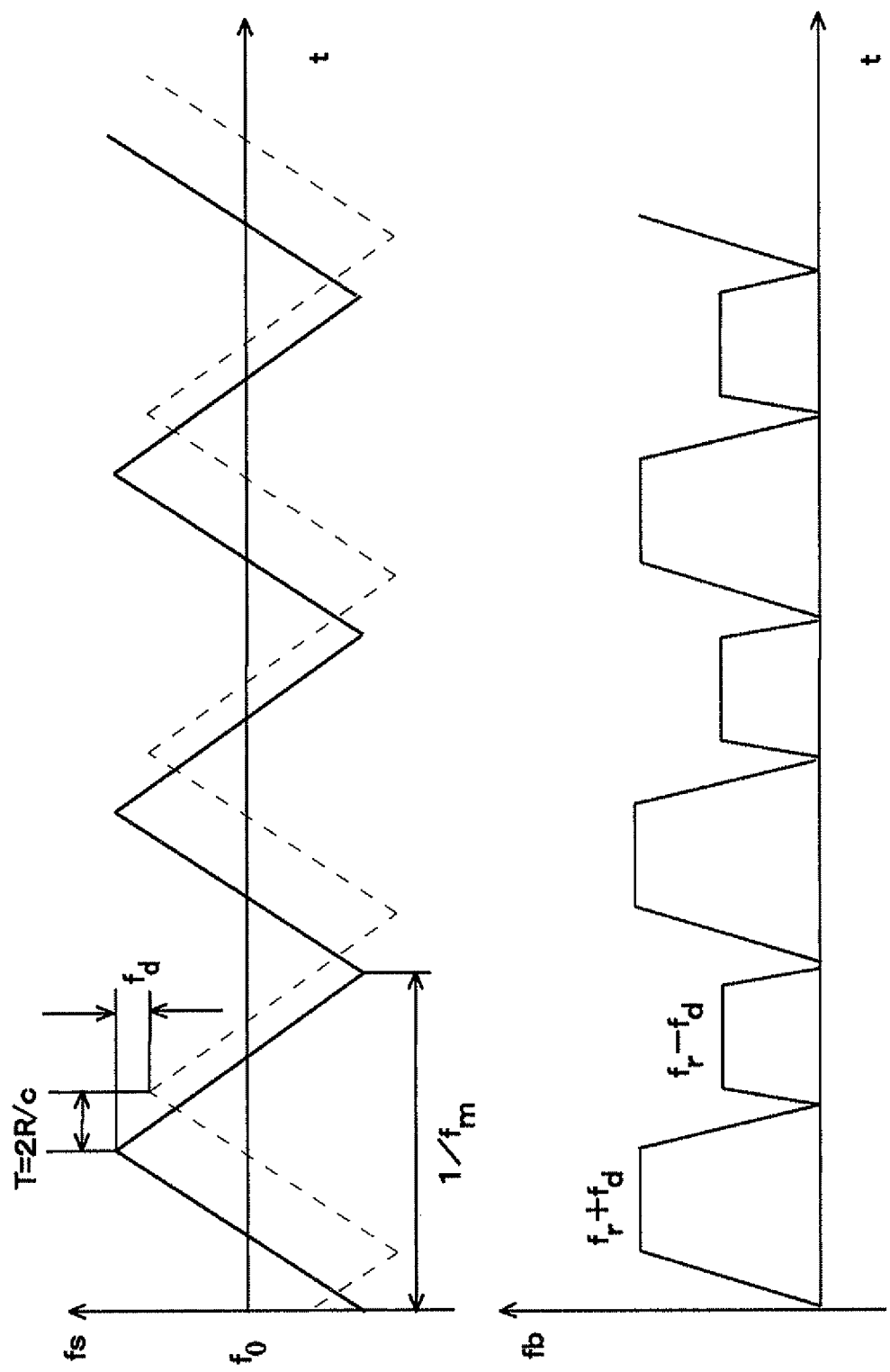
FIG. 7 is a view mainly illustrating a transmission signal and a reception signal of the radar apparatus.

FIG. 7 is a view mainly illustrating a transmission signal and reception signal of the radar apparatus 1. The upper view of FIG. 7 shows the signal waveforms of a FM-CW transmission signal and a FM-CW reception signal. Also, the lower view of FIG. 3 shows beat frequencies generated by the frequency difference between the transmission signal and the reception signal. In the upper view of FIG. 3, the horizontal axis represents time (ms), and the vertical axis represents frequency (GHz). The transmission signal shown by a solid line in the upper view of FIG. 3 has the characteristic that the frequency changes with a predetermined period, and has UP sections where the frequency increases from a predetermined lower frequency to a predetermined upper frequency, and DOWN sections where the frequency decreases from the predetermined upper frequency to the predetermined lower frequency.

In other words, the transmission signal periodically changes between the predetermined lower frequency and the predetermined upper frequency. If the transmission wave is output from the transmitting antennae 13 and is reflected from a target, the receiving antennae 14 receive the reflected wave as a reception signal. The reception signal is as shown by a broken line in FIG. 7. Similarly to the transmission signal, the reception signal also has UP sections and DOWN sections.

Also, according to the longitudinal distance between the vehicle 100 and the target, the reception signal has a time delay T (=2R/c) with respect to the transmission signal. Further, in a case where there is a speed difference between the vehicle 100 and the target, with respect to the transmission signal, the reception signal shifts in parallel along the axis of the frequency fs. This Doppler shift amount becomes fd.

In the lower view of FIG. 7, the horizontal axis represents time (ms), and the vertical axis represents frequency (KHz). The lower view of FIG. 7 shows beat frequencies representing the frequency difference between the transmission signal and the reception signal in each UP section, and the frequency difference between the transmission signal and the reception signal in each DOWN section.

Here, the longitudinal distance of the target relative to the vehicle 100 is derived by Equation 1, and the relative speed of the target relative to the vehicle 100 is derived by Equation 2. Also, the angle of the target relative to the vehicle 100 is derived by Equation 3. Then, from information on the angle derived by Equation 3 and the longitudinal distance of the target, the lateral distance of the target relative to the vehicle 100 is derived by an operation using a trigonometric function.

[EQUATION 1]

$$R = \frac{(f_{up} + f_{dn}) \cdot c}{2 \times (4 \times \Delta F \times f_m)} \quad (1)$$

[EQUATION 2]

$$V = \frac{(f_{up} - f_{dn}) \cdot c}{2 \times (4 \times \Delta F \times f_m)} \quad (2)$$

[EQUATION 3]

$$\theta_m = \frac{\theta_{up} + \theta_{dn}}{2} \quad (3)$$

3. Process Flow Chart

<3-1. Entire Process>

Figure 8:
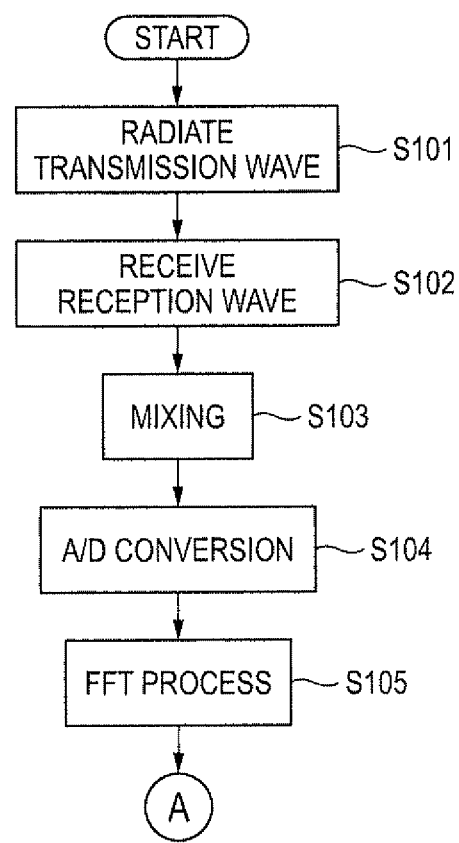
FIG. 8 is a flow chart of a target information deriving process.
Figure 9:
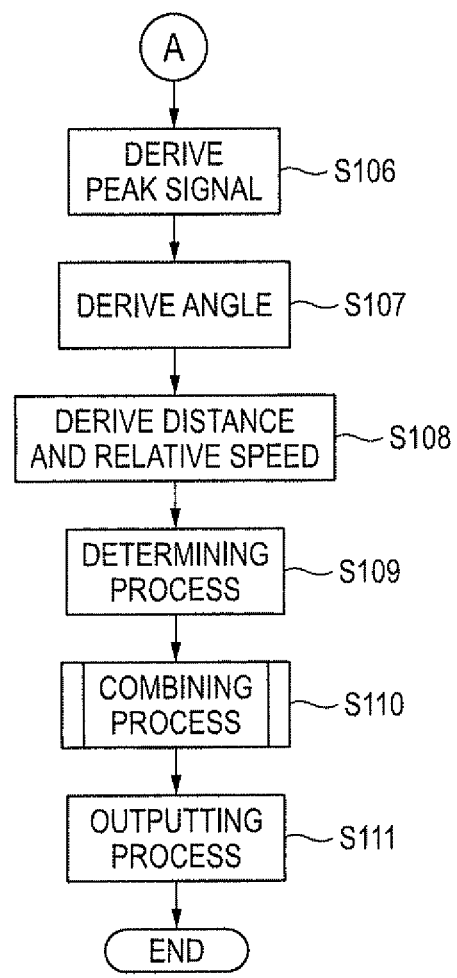
FIG. 9 is another flow chart of the target data deriving process.

FIGS. 8 and 9 are flow charts illustrating the target information deriving process. In STEP S101 shown in FIG. 8, the transmitting antennae 13 radiate the transmission wave corresponding to the transformed signal output from the oscillator 12, to the outside of the vehicle 100. Then, the target information deriving process proceeds to the process of STEP S102.

Also, in a case where one UP section and one DOWN section of the transmission signal constitute one period, the transmission wave corresponding to the first period is output from one transmitting antenna 13a to the outside of the vehicle 100, and the transmission wave corresponding to the second period is output from the other transmitting antenna 13b to the outside of the vehicle 100.

If the transmission wave is reflected from targets, in STEP S102, the receiving antennae 14 receive the reflected waves. Then, the target information deriving process proceeds to the process of STEP S103.

In STEP S103, the mixers 15 mix reception signals corresponding to the reflected waves received by the receiving antennae 14 with the transmission signal, thereby generating beat signals which are differences between the transmission signal and the reception signals. Then, the target information deriving process proceeds to the process of STEP S104.

In STEP S104, the AD converters 16 covert the beat signals which are analog signals into digital data. Then, the target information deriving process proceeds to the process of STEP S105.

In STEP S105, the signal processing unit 17 performs an FFT process on the beat signals which are the digital data, thereby generating the transformed signals. Then, the target information deriving process proceeds to the process of STEP S106.

In STEP S106 of FIG. 9, from the transformed signals, the signal processing unit 17 derives transformed signals exceeding a predetermined threshold value as peak signals. Then, the target information deriving process proceeds to the process of STEP S107. In STEP S107, the signal processing unit 17 performs an angle computing process on the basis of the peak signals in each of the UP section and the DOWN section. Then, the target information deriving process proceeds to the process of STEP S108.

Specifically, the signal processing unit 17 derives the angle of each target according to a predetermined angle deriving process algorithm. For example, the angle deriving process algorithm is Estimation of Signal Parameters via Rotational Invariance Techniques (ESPRIT) in which the eigenvalue, eigenvector, and the like of a correlation matrix is computed from information on the phase differences between the reception signals of the receiving antennae 14a to 14d, and an angle θup corresponding to the peak signal of the UP section and an angle θdn corresponding to the peak signal of the DOWN section are derived on the basis of the eigenvalue and the eigenvector. Further, on the basis of the angles of the peak signals of the UP section and the DOWN section, the angle of the target is derived by the above Equation 3.

In STEP S108, the signal processing unit 17 pairs the peak signals of the UP section and the DOWN section, and derives the longitudinal distance and relative speed of the target relative to the vehicle 100 on the basis of the above Equations 1 and 2. Then, the target information deriving process proceeds to the process of STEP S109.

In STEP S109, the signal processing unit 17 performs a process of determining whether there is a temporarily continuing relation between the pair data (hereinafter, referred to as "current pair data") obtained by the current target deriving process and data (hereinafter, referred to as "predicted pair data") obtained by predicting the current pair data on the basis of the target information derived by the past target deriving process. Then, in a case where there is a temporarily continuing relation between the current pair data and the predicted pair data, a filtering process is performed between the current pair data and the predicted pair data, and the filtered pair data (hereinafter, referred to as "past corresponding pair data") as the target data of the current scanning.

Here, the case where there is a temporarily continuing relation between the current pair data and the predicted pair data is, for example, a case where each of the values of the differences in the longitudinal distance, lateral distance, and relative speed between the current pair data and the predicted pair data is a predetermined value or less. Further, in the case where there is a temporarily continuing relation between the current pair data and the predicted pair data, for example, in terms of the longitudinal distances, the signal processing unit 17 assigns a weight of 0.5 to the longitudinal distance of the predicted pair data, and assigns a weight of 0.5 to the longitudinal distance of the current pair data. Then, the signal processing unit 17 derives the sum of the weighted values as the longitudinal distance of the past corresponding pair data of the current scanning. Similarly, even in terms of the relative speeds and the angles, a filtering process is performed.

Meanwhile, in a case where any one of the values of the differences in the longitudinal distance, lateral distance, and relative speed between the current pair data and the predicted pair data is greater than the predetermined value, the signal processing unit 17 determines that there is no temporarily continuing relation between the current pair data and the predicted pair data. Then, the pair data determined as having no continuity like that becomes data derived for the first time in the current target deriving process (hereinafter, referred to as "new pair data"). The distance, relative speed, angle, and signal level of the new pair data become the distance, relative speed, angle, and signal level of one target in the current target deriving process. The signal processing unit 17 performs the determining process and the filtering process as described above, thereby deriving the longitudinal distance, lateral distance, and relative speed of the target in one target deriving process. Then, the target information deriving process proceeds to the process of STEP S110. Also, in the process of STEP S109, it is determined whether the kind of the target derived by the signal processing unit 17 is a moving target or a still target.

In STEP S110, the signal processing unit 17 performs the combining process of deriving the representative position of targets, included in a predetermined range, of the plurality of targets. Then, the target information deriving process proceeds to the process of STEP S111. The combining process will be described below in detail. In STEP S111, the signal processing unit 17 outputs the target information of a representative target located at the representative position derived by the combining process of STEP S110, to the vehicle control device 2. Then, the target information deriving process terminates. Like this, the representative target position exists in the lane in which the vehicle 100 with the radar apparatus 1 mounted thereon runs. Therefore, the vehicle 100 can continuously follow the preceding vehicle 111 running in the same lane, regardless of the road shape.

<3-2. Combining Process>

Figure 10:
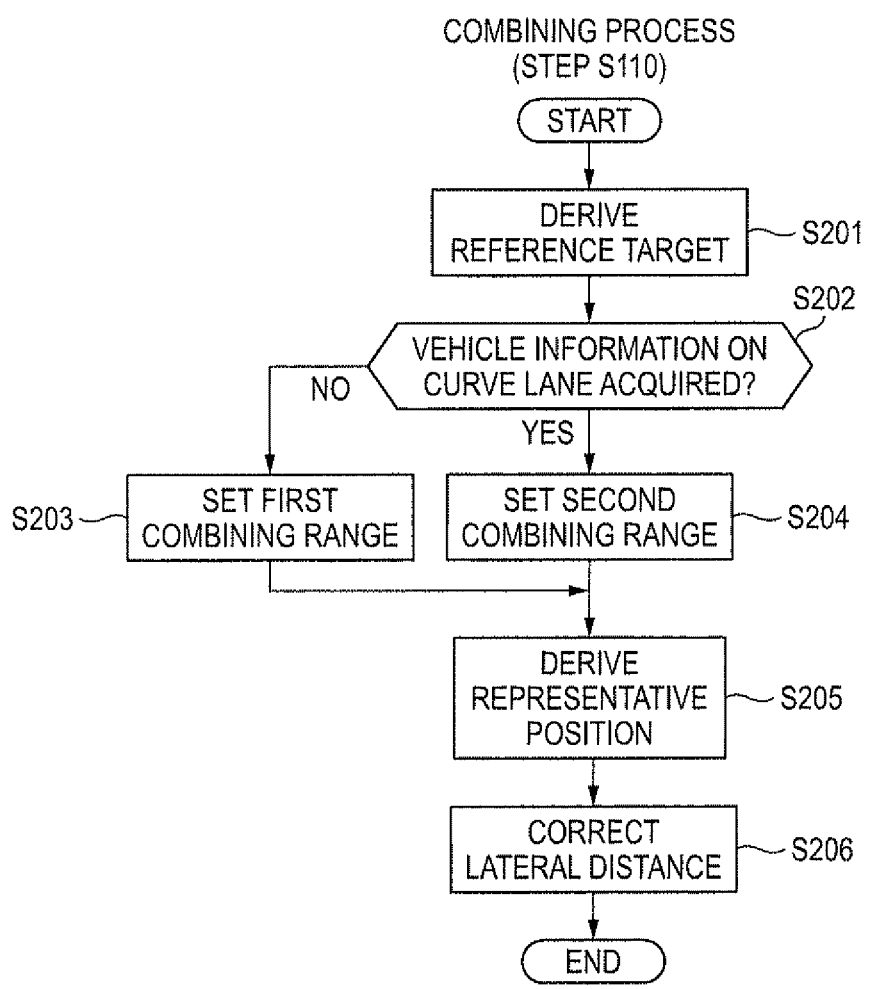
FIG. 10 is a flow chart of the combining process.
Figure 11:
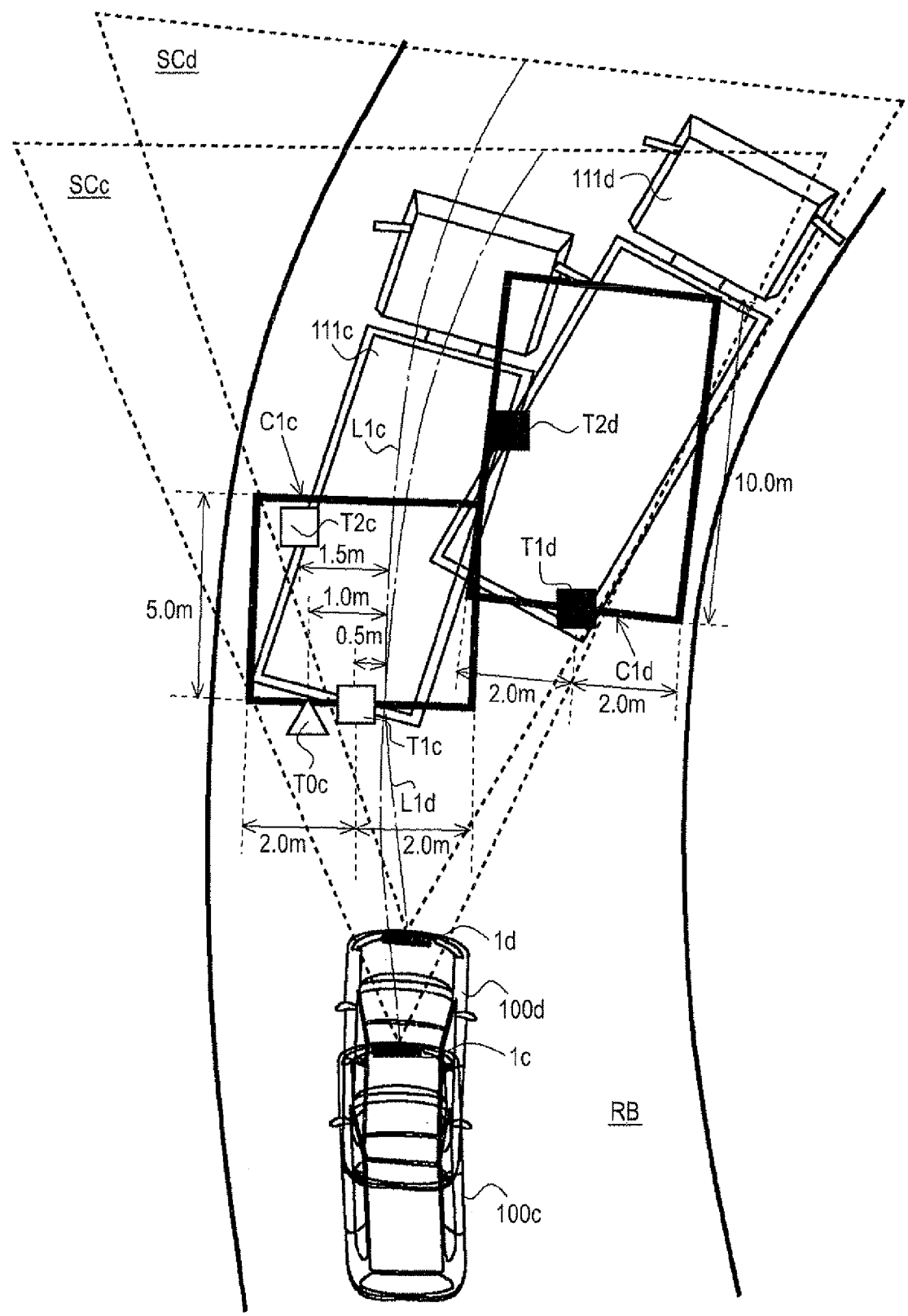
FIG. 11 is a view illustrating setting of the combining range in a case where the preceding vehicle runs in the curve lane.

Now, the combining process of the signal processing unit 17 will be described with reference to FIG. 10. FIG. 10 is a flow chart of the combining process. This process follow chart will be described appropriately using FIGS. 11 and 12 for describing the process contents in detail. Here, FIGS. 11 and 12 are views illustrating setting of the combining range in a case where the preceding vehicle 111 runs in the curve lane RB. Also, in the components of FIGS. 11 and 12, components having reference symbols with "d" attached thereto show states later in time than components having reference symbols with "c" attached thereto. In other words, if the components having the reference symbols with "d" attached thereto are the current components, the components having the reference symbols with "c" attached thereto are the past components.

In STEP S201 of FIG. 10, the signal processing unit 17 derives a reference target which is a target having the smallest lateral distance with respect to the vehicle 100, from the plurality of targets. Then, the combining process proceeds to the process of STEP S202.

In STEP S202, the signal processing unit 17 determines whether vehicle information on any curve lane has been acquired from the vehicle control device 2. If vehicle information on any curve lane has not been acquired (No in STEP S202), the combining process proceeds to the process of STEP S203.

In STEP S203, the signal processing unit 17 sets the first combining range. Then, the combining process proceeds to the process of STEP S205.

In STEP S205, the signal processing unit 17 derives the representative position of targets included in the first combining range. Then, the combining process proceeds to the process of STEP S206. In STEP S206, the signal processing unit 17 corrects the lateral distance of the representative target. Then, the combining process terminates. For example, in a case where the lateral distance of the representative target is +1.8 m, in order for shift to a position closer to the reference axis, the signal processing unit 17 corrects the lateral distance toward the reference axis by −0.5 m, such that the lateral distance becomes +1.3 m. In other words, the signal processing unit 17 performs the correction such that the absolute value of the lateral distance of the representative target becomes a value smaller than the original value. In this way, it is possible to surely derive the representative position of the targets in the lane RB in which the vehicle 100 with the radar apparatus 1 mounted thereon runs.

Now, the above-mentioned process will be described in detail. In a case where the vehicle 100 is, for example, at the position of a vehicle 100c as shown in FIG. 11, the transmission wave radiation range of a radar apparatus 1c is a scan range SCc. Then, if reflected waves from two reflective points of a preceding vehicle 111c existing in the scan range SCc are received by the receiving antennae 14 of the radar apparatus 1c, the signal processing unit 17 derives two targets (a target T1c and a target T2c) corresponding to those reflected waves. Next, from the two targets, that is, the target T1c and the target T2c, the signal processing unit 17 derives the target T1c having the smallest longitudinal distance with respect to the vehicle 100c, as the reference target (corresponding to the process of STEP S201 shown in FIG. 10).

Since the signal processing unit 17 has not acquired vehicle information on any curve lane (corresponding to the case where the determination result of STEP S202 is "No"), the signal processing unit 17 sets a predetermined first combining range C1c having a length of 5.0 m in the longitudinal direction (the running direction of the vehicle 100c) from the position of the target T1c and widths of 2.0 m in lateral directions (directions substantially perpendicular to a reference axis L1c (the left and right directions)) from the position of the target T1c (corresponding to the process of STEP S203).

Next, on the basis of the targets (the target T1c and the target T2c) included in the combining range C1c, the signal processing unit 17 derives the representative position of the targets. Specifically, the signal processing unit 17 derives the representative position in which the representative longitudinal distance is the longitudinal distance of the reference target having the smallest longitudinal distance with respect to the vehicle 100, and the representative lateral distance is the average of the lateral distances of two targets, having the smallest and largest lateral distances, respectively, of the targets included in the combining range C1c. In other words, the signal processing unit 17 derives the longitudinal distance of the target T1c which is the reference target, as the representative longitudinal distance, and derives the average of the lateral distances of the target T1c (having the largest lateral distance of −0.5 m in the combining range C1c) and the target T2c (having the smallest lateral distance of −1.5 m in the combining range C1c), as the representative lateral distance (a lateral distance of −1.0 m). Then, the signal processing unit 17 sets a target of the representative position to a representative target T0c (corresponding to the process of STEP S205).

Next, the signal processing unit 17 corrects the lateral distance of the representative target T0c. For example, the signal processing unit 17 corrects the lateral distance of −1.0 m such that the representative target shifts to a position closer to the reference axis L1c, and as a result, the lateral distance of the representative target T0c becomes −0.5 m (corresponding to STEP S206). As a result, the absolute value of the lateral distance of the representative target T0c becomes 0.5 m. Then, the vehicle control device 2 sets the representative target T0c as the guiding object for the ACC on the basis of the target information, and controls the brake 50 and the throttle 51 of the vehicle 100c such that the vehicle 100c follows the preceding vehicle 111c corresponding to the representative target T0c.

Returning to the process flow chart of FIG. 10, if it is determined in STEP S202 that the signal processing unit 17 has acquired information on a curve lane from the vehicle control device 2 (Yes in STEP S202), the following process is performed. In this case, the process of the signal processing unit 17 proceeds to STEP S204.

In STEP S204, the signal processing unit 17 sets the second combining range wider than the first combining range. Then, the combining process proceeds to STEP S205.

In STEP S205, the signal processing unit 17 derives a representative position in the second combining range. Then, the combining process proceeds to the process of STEP S206.

In STEP S206, the signal processing unit 17 corrects the lateral distance of a representative target. Then, the combining process terminates. For example, in a case where the lateral distance of the representative target is +1.8 m, in order for shift to a position closer to the reference axis, the signal processing unit 17 corrects the lateral distance by −0.5 m toward the reference axis, such that the lateral distance becomes +1.3 m. In other words, the signal processing unit 17 performs the correction such that the absolute value of the lateral distance of the representative target becomes a value smaller than the original value. In this way, it is possible to surely derive the representative position of the targets in the lane RS in which the vehicle 100 with the radar apparatus 1 mounted thereon runs. This process will now be described in detail. In a case where the vehicle 100 is, for example, at the position of a vehicle 100d as shown in FIG. 11, the transmission wave radiation range of a radar apparatus 1d is a scan range SCd. Then, if reflected waves from two reflective points of a preceding vehicle 111d existing in the scan range SCd are received by the receiving antennae 14 of the radar apparatus 1d, the signal processing unit 17 derives two targets (a target T1d and a target T2d) corresponding to those reflected waves. Next, from the two targets, that is, the target T1d and the target T2d, the signal processing unit 17 derives the target T1d having the smallest longitudinal distance with respect to the vehicle 100d, as the reference target (corresponding to STEP S201 shown in FIG. 10).

Since the signal processing unit 17 has acquired the vehicle information on the curve lane (corresponding to the case where the determination result of STEP S202 is "Yes"), the signal processing unit 17 sets a second combining range C1d, which has a length of 10.0 m in the longitudinal direction (the running direction of the vehicle 100d) from the position of the target T1d, and widths of 2.0 m in lateral directions (directions substantially perpendicular to a reference axis L1d (the left and right directions)) from the position of the target T1d, and is wider than the first combining range C1c (corresponding to the process of STEP S204).

In other words, in a case where the signal processing unit 17 has acquired at least one of the first vehicle information and the second vehicle information, the signal processing unit 17 sets the second combining range C1d which is obtained by extending only a longitudinal length of the first combining range C1c. Here, the lateral width of the second combining range C1d is the same as the lateral width of the first combining range C1c. However, it is possible to set the lateral width of the second combining range C1d to a width different from the lateral width of the first combining range C1c as long as a new target is not included in the second combining range C1d. In other words, the signal processing unit 17 can set the lateral width of the second combining range C1d to a width different from that of the first combining range C1e as long as it is possible to derive the same representative position as that derived on the basis of the second combining range C1d of which the longitudinal length is extended relative to the first combining range C1c.

In STEP S202 of FIG. 10, the vehicle information corresponds to the first vehicle information and the second vehicle information, and is specifically, for example, information which is shown in a case where a curve radius derived on the basis of information acquired from the steering sensor 41, the camera 42, and the like is in a predetermined range, and represents the curve radius is larger than 0 m and smaller than 2000 m.

Figure 12:
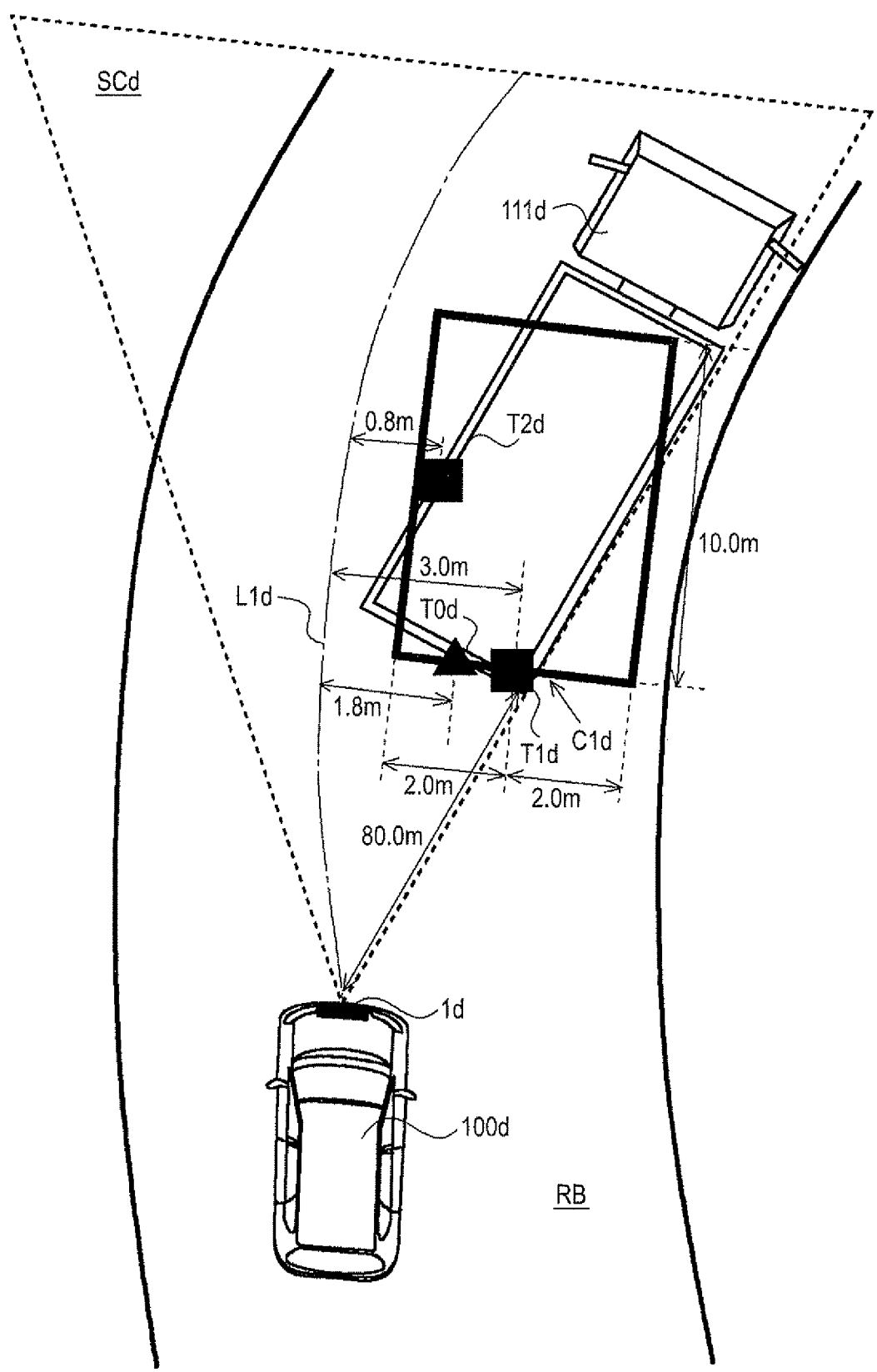
FIG. 12 is another view illustrating the setting of the combining range in a case where the preceding vehicle runs in the curve lane.

Next, the signal processing unit 17 derives the representative position of the targets on the basis of the targets (the target T1d and the target T2d) included in the combining range C1d as shown in FIG. 12. Specifically, the signal processing unit 17 derives the longitudinal distance of the reference target having the smallest longitudinal direction with respect to the vehicle 100d, as the representative longitudinal distance, and derives the average of the lateral distances of targets, which have the smallest lateral distance and the largest lateral distance, respectively, of the targets included in the combining range C1d, as the representative lateral distance. In other words, the signal processing unit 17 derives the longitudinal distance (80.0 m) of the target T1d which is the reference target, as the representative longitudinal distance, and derives the average of the lateral distances of the target T1d (having the largest lateral distance of +3.0 m in the combining range C1d) and the target T2d (having the smallest lateral distance of +0.8 m in the combining range C1d), as the representative lateral distance (lateral distance of +1.8 m). Next, the signal processing unit 17 sets a target of the representative position to a representative target T0d (corresponding to the process of STEP S205).

Next, the signal processing unit 17 corrects the lateral distance of the representative target T0d. For example, the signal processing unit 17 corrects the lateral distance of +1.8 m of the representative target T0d such that the representative target shifts to a position closer to the reference axis L1c, and as a result, the lateral distance of the representative target T0d becomes +1.3 m (corresponding to STEP S206). Therefore, it is possible to derive the representative position of the targets in the lane in which the vehicle 100d with the radar apparatus 1d mounted thereon runs, regardless of the road shape, while excluding a target, existing on a neighboring lane next to the lane RB in which the vehicle 100d with the radar apparatus 1d mounted thereon runs, from targets for the representative position deriving process.

Also, since the absolute value of the lateral distance of the representative target T0d becomes 1.8 m (1.3 m after the correction), the vehicle control device 2 sets the representative target T0d as the guiding object for the ACC on the basis of the target information, and controls the brake 50 and the throttle 51 of the vehicle 100d such that the vehicle 100d follows the preceding vehicle 111d corresponding to the representative target T0d.

Further, as described above, in the case where the signal processing unit 17 has acquired at least one of the first vehicle information and the second vehicle information, the signal processing unit 17 sets the second combining range C1d wider than the first combining range C1c and derives the representative target. Meanwhile, in the case where the signal processing unit 17 has not acquired any vehicle information of the first vehicle information and the second vehicle information, the signal processing unit 17 sets the first combining range C1c narrower than the second combining range C1d and performs the process of deriving the representative target. Therefore, it is possible to derive the representative position of the targets in the lane in which the vehicle 100 with the radar apparatus 1 mounted thereon runs, regardless of the road shape. In other words, since the signal processing unit 17 selects a combining range from the plurality of combining ranges according to the road shape of the lane in which the vehicle 100 runs, it is possible to derive the representative target in the lane in which the vehicle 100 runs.

Second Embodiment

Now, a second embodiment will be described. The configuration and process of the second embodiment are the same as those of the first embodiment except for some process contents of the combining process. The specifically different process contents are to exclude targets having the absolute values of lateral distances relative to the vehicle 100 larger than that of the reference target, from targets for the representative position deriving process. Hereinafter, the above-mentioned difference will be mainly described with reference to the drawings.

Figure 13:
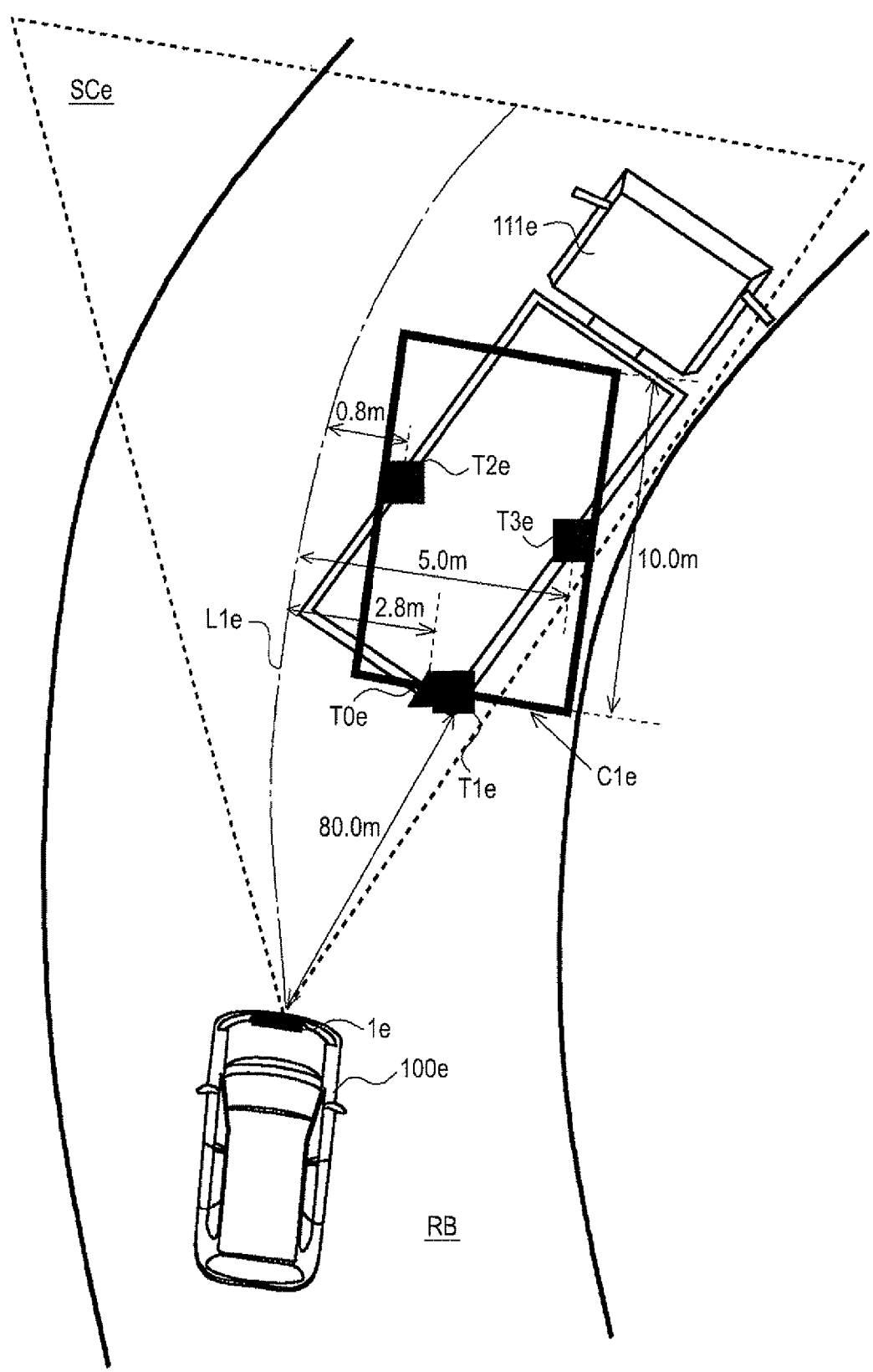
FIG. 13 is a view illustrating a process of deriving a representative position in the combining range in the case where the preceding vehicle runs in the curve lane.

FIG. 13 is a view illustrating a process of deriving a representative position in a combining range in a case where a preceding vehicle 111e runs in the curve lane RB. In the case of the preceding vehicle 111e running in the lane RB as shown in FIG. 13, the inclination of the preceding vehicle 111e relative to a vehicle 100e is larger than the inclination of the preceding vehicle 111d relative to the vehicle 100d described with reference to FIG. 12.

As shown in FIG. 13, in a case where the vehicle 100 is at the position of the vehicle 100e, the transmission wave radiation range of a radar apparatus 1e becomes a scan range SCe. Then, reflected waves from three reflective points of the preceding vehicle 111e existing in the scan range SCe are received by the receiving antennae 14 of the radar apparatus 1e, and the signal processing unit 17 derives three targets (a target T1e, a target T2e, and a target T3e) corresponding to those reflected waves. Next, the signal processing unit 17 selects the target T1e having the smallest longitudinal distance with respect to the vehicle 100e from the three targets, that is, the targets T1e, T2e, and T3e, and sets the selected target as a reference target.

In this case, since the inclination of the preceding vehicle 111e relative to the vehicle 100e is larger than the inclination of the preceding vehicle 111d relative to the vehicle 100d described with reference to FIG. 12, the number of targets derived by the signal processing unit 17 is greater than the number of targets (two targets) described with reference to FIG. 12. In other words, the signal processing unit 17 derives the three targets, that is, the target T1e corresponding to a reflected wave from the rear bumper of the preceding vehicle 111e, the target T2e corresponding to a reflected wave of the transmission wave from a wheel or component of the preceding vehicle 111e positioned between the floor of the preceding vehicle 111e and the road surface of the lane RB, and the target T3e corresponding to a reflected wave from the right side surface of the preceding vehicle 111e, as shown in FIG. 13.

Next, the signal processing unit 17 sets a second combining range C1e including the target T1e which is the reference target. The second combining range C1e has a length of 10.0 m in the longitudinal direction (the running direction of the vehicle 100e) from the position of the target T1e, and widths of 2.0 m in lateral directions (directions substantially perpendicular to a reference axis L1e (the left direction and the right direction)) from the position of the target T1e, and is wider than the first combining range C1c.

In other words, in a case where the vehicle control device 2 of the vehicle 100e has acquired at least one of the first vehicle information and the second vehicle information, the signal processing unit 17 sets the second combining range C1e which is obtained by extending the longitudinal length of the first combining range C1c. Here, the lateral width of the second combining range C1e is the same as the lateral width of the first combining range C1c. However, it is possible to set the lateral width of the second combining range C1e to a width different from the lateral width of the first combining range C1c as long as a new target is not included in the second combining range C1e. In other words, the signal processing unit 17 can set the lateral width of the second combining range C1e to a width different from that of the first combining range C1c as long as it is possible to derive the same representative position as that derived in the first combining range C1c, on the basis of the targets included the second combining range C1e of which the longitudinal length is extended relative to the first combining range C1c.

Next, the signal processing unit 17 derives the representative position of the targets on the basis of the targets (the targets T1e, T2e, and T3e) included in the combining range C1e. Specifically, the signal processing unit 17 derives the longitudinal distance of the reference target having the smallest longitudinal direction with respect to the vehicle 100e, as the representative longitudinal distance, and derives the average of the lateral distances of targets, which have the smallest lateral distance and the largest lateral distance, respectively, of the targets included in the combining range C1e, as the representative lateral distance. In other words, the signal processing unit 17 derives the longitudinal distance (80.0 m) of the target T1e which is the reference target, as the representative longitudinal distance, and derives the average of the lateral distances of the target T3e (having the largest lateral distance of +5.0 m in the combining range C1e) and the target T2e (having the smallest lateral distance of +0.8 m in the combining range C1e), as the representative lateral distance (lateral distance of +2.8 m). Next, the signal processing unit 17 sets a target of the representative position to a representative target T0e.

Since the absolute value (2.8 m) of the lateral distance of the representative target T0e exceeds the absolute value (1.8 m) of the lateral distance which is a reference for setting a target as the guiding object for the ACC, although receiving the target information of the representative target T0e, the vehicle control device 2 of the vehicle 100e does not set the preceding vehicle 111e as the guiding object for the ACC. Like this, although the preceding vehicle 111e which should be set as the guiding object for the ACC exists in front of the vehicle 100, the vehicle control device 2 may not perform setting of the ACC.

Figure 14:
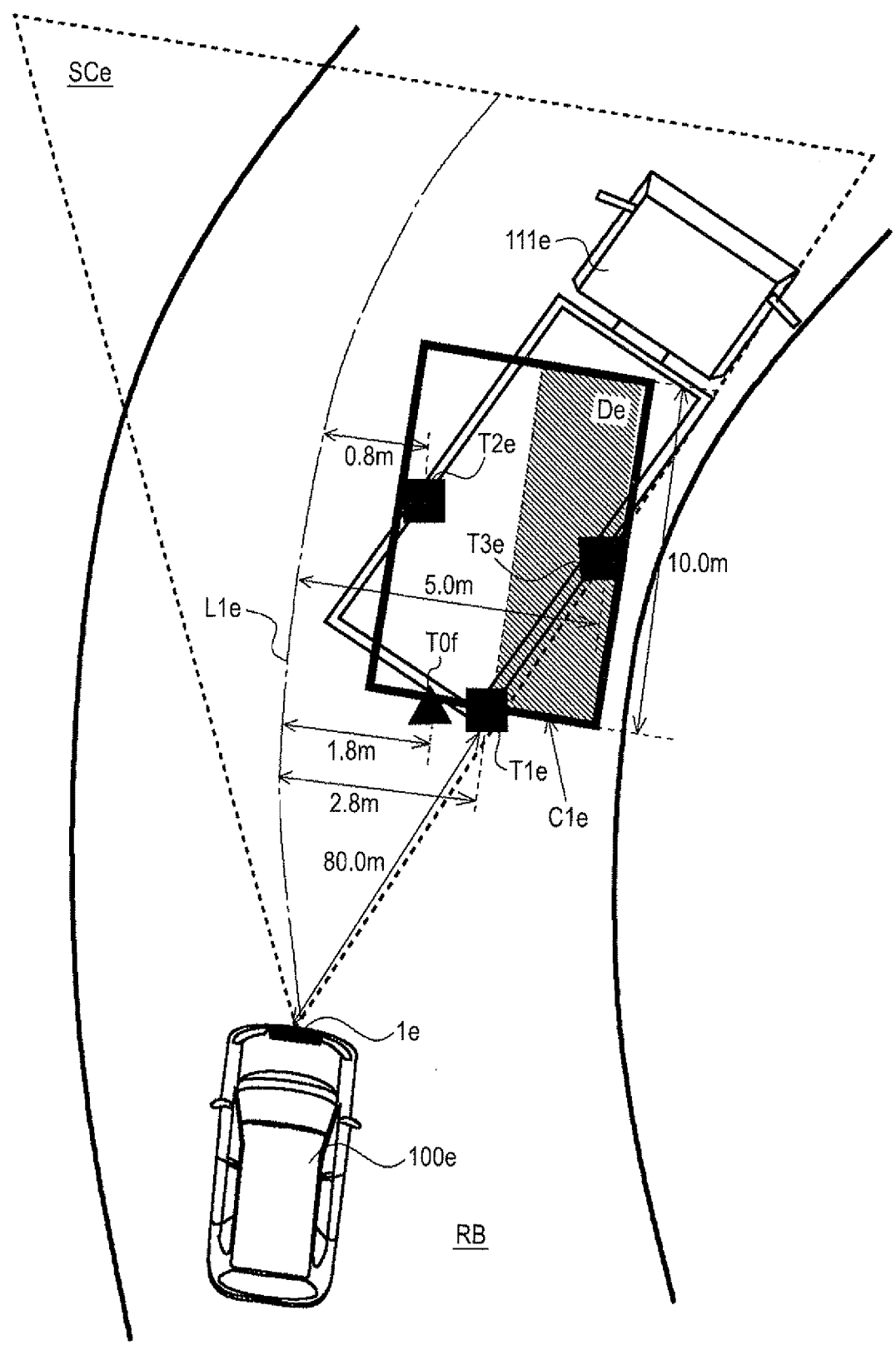
FIG. 14 is a view illustrating a process of excluding a target, having a lateral distance whose absolute value is larger than that of a reference target, from targets for deriving the representative position.

As a countermeasure against that situation, the following process may be performed. In other words, the signal processing unit 17 performs a process of selecting a target having the absolute value of the lateral distance relative to the vehicle 100 larger than that of the reference target T1e from the targets included in the combining range C1e, and excluding the selected target from targets for the representative position deriving process. This process will be described with reference to FIG. 14. FIG. 14 is a view illustrating the process of excluding a target, having the absolute value of a lateral distance larger than that of the reference target T1e, from the targets for the representative position deriving process. As shown in FIG. 14, the signal processing unit 17 sets the second combining range C1e including the target T1e which is the reference target, and then excludes a target, which is included in the combining range C1e and has the absolute value of a lateral distance larger than that of the target T1e which is the reference target, from the targets for the representative position deriving process. In other words, the signal processing unit 17 excludes a target, which is included in an exclusion range De corresponding to almost half of the combining range C1e which is on the inner side relative to the position of the reference target T1e in a curve direction, from the targets for the representative position deriving process.

As a result, the target T3e included in the exclusion range De is excluded from the targets for the representative position deriving process, and on the basis of the remaining targets (the target T1e and the target T2e) except for the target T3e included in the second combining range C1e, the signal processing unit 17 derives the representative position of the targets. Specifically, the signal processing unit 17 derives the longitudinal distance of the target T1e which is the reference target having the smallest longitudinal direction with respect to the vehicle 100e, as the representative longitudinal distance, and derives the average of the lateral distances of the target T1e and the target T2e, having the largest lateral distance (lateral distance of +2.8 m) and the smallest lateral distance (lateral distance of +0.8 m), respectively, of the targets included in the combining range C1e, as the representative lateral distance (lateral distance of +1.8 m).

Next, the signal processing unit 17 sets a target of that representative position to a representative target T0f. Like this, since the target having the absolute value of the lateral distance larger than that of the reference target T1e is excluded from the targets for the representative position deriving process, it is possible to derive the representative position of the targets at a position closer to the reference axis L1e of the radar apparatus 1e, and it is possible to derive the representative position of the targets in the lane RB in which the vehicle 100e with the radar apparatus 1e mounted thereon runs, regardless of the road shape.

Also, since the absolute value (1.8 m) of the lateral distance of the representative target T0f becomes equal to or less than the absolute value (1.8 m) of the lateral distance of which is the reference for setting a target to be the guiding object in the ACC, the vehicle control device 2 sets the representative target T0f as the guiding object for the ACC, and controls the brake 50 and the throttle 51 of the vehicle 100e such that the vehicle 100e follows the preceding vehicle 111e corresponding to the representative target T0f. Therefore, the vehicle 100e can continuously follow the preceding vehicle 111e, regardless of the road shape.

<Modifications>

Although the embodiments of the present invention have been described, the present invention is not limited to the above-mentioned embodiments, and can be modified in various forms. These modifications will now be described. All forms including the forms described in the above-mentioned embodiment and forms to be described below can be appropriately combined.

In the above-mentioned embodiments, the vehicle information which the signal processing unit 17 acquires is vehicle information of the steering sensor 41, the camera 42, and the navigation device 52. However, the vehicle information which the signal processing unit 17 acquires may be vehicle information of other units as long as it is possible to derive vehicle information indicating that the road shape is a curve shape. For example, the vehicle information which the signal processing unit 17 acquires may be vehicle information from a yaw rate sensor which detects an angular velocity as a change in the direction of the vehicle body of the vehicle 100 and outputs the angular velocity to the vehicle control device 2.

Also, in the above-mentioned embodiments, the vehicle control device 2 may be configured to receive all of the first vehicle information based on the information of the steering sensor 41 and the second vehicle information based on the information of the camera 42 and the navigation device 52. For example, in a case where the vehicle 100 does not include the camera 42 and the navigation device 52, the vehicle control device 2 may be configured to receive only the first vehicle information based on the information of the steering sensor 41.

Further, in the above-mentioned embodiments, the information of the steering sensor 41, the camera 42, and the navigation device 52 may not be output to the vehicle control device 2, and at least a part of the information of the steering sensor 41, the camera 42, and the navigation device 52 may be output directly to the signal processing unit 17 of the radar apparatus 1. As a result, the signal processing unit 17 acquires at least one of the first vehicle information and the second vehicle information, not through the vehicle control device 2.

Furthermore, in the above-mentioned embodiments, the values of the longitudinal distances and the lateral distances are illustrative, and may be other values. Also, the values representing the sizes of the combining ranges are illustrative, and may be other values. Further, although the absolute value of the lateral distance of a target in a case of setting the target as a guiding object in the ACC has been set to 1.8 m, this value is also illustrative, and may be another value according to the width of the road in which vehicle 100 runs.

Also, in the above-mentioned embodiments, in the filtering of STEP S109 shown in FIG. 9, the weight on each data is illustrative, and may be a value different from the value of the above-mentioned embodiments.

Further, in the above-mentioned embodiments, the radar apparatus 1 uses ESPRIT as a scheme of estimating the direction of an object without driving the transmitting antennae 13 and the receiving antennae 14. However, besides ESPRIT, it is possible to use at least one algorithm of Digital Beam Forming (DBF), Propagator method based on an Improved Spatial-smoothing Matrix (PRISM), Multiple Signal Classification (MUSIC), etc. Also, this technology can be applied even to a mega scan scheme in which transmitting antennae and receiving antennae are, for example, flat panel antennae, and the flat panel antennae are driven.

Also, in the above-mentioned embodiments, the transmission wave and the reflected waves which are transmitted and received by the transmitting antennae 13 and the receiving antennae 14 are signals such as electric waves, laser beams, or ultrasonic waves. However, the transmission wave may be any signal which can be output from the transmitting antennae 13, rebound from an object, and be received as the reflected waves by the receiving antennae 14, such that the signal processing unit 17 can derive target information.

Also, in the above-mentioned embodiment, the radar apparatus 1 is mounted on a vehicle; however, it may also be used for many purposes (for example, at least one of monitoring of an aircraft in flight and monitoring of a ship under way).

What is claimed is:

1. A radar apparatus configured to radiate a transmission wave relating to a frequency-modulated transmission signal, receive a reflected wave of the transmission wave from a target as a reception signal, and derive at least position information of the target from the reception signal, the radar apparatus comprising:
a setting unit configured to set a first range including at least a reference target which is derived according to a value of a longitudinal distance relative to a vehicle mounted with the radar apparatus;
a deriving unit configured to derive a representative position of targets included in the first range on the basis of position information of the targets included in the first range; and
an acquiring unit configured to acquire at least one of first vehicle information indicating that the vehicle is running in a curve-shaped lane and second vehicle information indicating that a road shape in front of the vehicle is a curve shape,
wherein when the acquiring unit acquires the at least one of the first vehicle information and the second vehicle information, the setting unit sets a second range wider than the first range and the deriving unit derives a representative position of targets included in the second range on the basis of position information of the targets included in the second range.

2. The radar apparatus according to claim 1, wherein the second range is a range obtained by extending a longitudinal length of the first range.

3. The radar apparatus according to claim 1, wherein the deriving unit excludes a target of the targets included in the second range, having an absolute value of a lateral distance relative to the vehicle larger than that of the reference target, from the targets for deriving the representative position.

4. A vehicle control system comprising:
the radar apparatus according to claim 1; and
a vehicle control device configured to control motion of the vehicle on the basis of information acquired from the radar apparatus.

5. A signal processing method of a radar apparatus configured to radiate a transmission wave relating to a frequency-modulated transmission signal, receive a reflected wave of the transmission wave from a target as a reception signal, and derive at least position information of the target from the reception signal, the signal processing method comprising:
(a) setting a first range including at least a reference target which is derived according to a value of a longitudinal distance relative to a vehicle mounted with the radar apparatus;
(b) deriving a representative position of targets included in the first range on the basis of position information of the targets included in the first range; and
(c) acquiring at least one of first vehicle information indicating that the vehicle is running in a curve-shaped lane and second vehicle information indicating that a road shape in front of the vehicle is a curve shape,
wherein when the step (c) acquires the at least one of the first vehicle information and the second vehicle information, the step (a) sets a second range wider than the first range and the step (b) derives a representative position of targets included in the second range on the basis of position information of the targets included in the second range.

* * * * *